(12) United States Patent
Solomon et al.

(10) Patent No.: US 12,481,924 B2
(45) Date of Patent: Nov. 25, 2025

(54) SYSTEM, METHOD AND/OR COMPUTER READABLE MEDIUM FOR MONITORING AND PREDICTIVELY CONTROLLING CLOSED ENVIRONMENTS

(71) Applicant: ESC INNOVATES INC., Alliston (CA)

(72) Inventors: Vernon Solomon, Oro-Medonte (CA); Aaron Styles, Hillsdale (CA); Adrian Typa, Toronto (CA); Forrest C. Curry, Barrie (CA); John R. White, Barrie (CA); Chris Adams, Alliston (CA); Jeffrey R. Bowles, Barrie (CA); Adam Bowles, Barrie (CA)

(73) Assignee: ESC INNOVATES INC., Alliston (CA)

( * ) Notice: Subject to any disclaimer, the term of this patent is extended or adjusted under 35 U.S.C. 154(b) by 0 days.

(21) Appl. No.: 18/122,934

(22) Filed: Mar. 17, 2023

(65) Prior Publication Data

US 2023/0316139 A1    Oct. 5, 2023

Related U.S. Application Data

(63) Continuation of application No. PCT/CA2022/051272, filed on Aug. 23, 2022.
(Continued)

(51) Int. Cl.
*G06N 20/00*    (2019.01)
*G05B 15/02*    (2006.01)
(Continued)

(52) U.S. Cl.
CPC ............ *G06N 20/00* (2019.01); *G05B 15/02* (2013.01); *G05B 23/0267* (2013.01);
(Continued)

(58) Field of Classification Search
CPC .... G06N 20/00; G05B 15/02; G05B 23/0267; G05B 23/0286; G05B 2219/2614; G16H 40/20; G06Q 50/265
See application file for complete search history.

(56) References Cited

U.S. PATENT DOCUMENTS

2015/0261229 A1*  9/2015  Roy ...................... G05B 15/02
                                                            700/277
2016/0305678 A1   10/2016  Pavlovski et al.
(Continued)

FOREIGN PATENT DOCUMENTS

WO    WO2020115791 A1    6/2020
WO    WO-2021152059 A1 *  8/2021  ............... A61L 2/24

OTHER PUBLICATIONS

International Search Report and Written Opinion of the International Searching Authority, issued in PCT/CA2022/051272, mailed Jan. 4, 2023.
(Continued)

*Primary Examiner* — Shelby A Turner
*Assistant Examiner* — Xiuqin Sun
(74) *Attorney, Agent, or Firm* — Harness, Dickey & Pierce, PLC

(57) ABSTRACT

The present disclosure provides a system for anticipating environmental conditions within a critical environment needed to maintain a set of established environmental parameters within the critical environment. The system includes process equipment for maintaining the set of established environmental parameters within the critical environment and sensors to obtain sensor data from the environment. The system also includes controllers controlling the operation of the process equipment and an onsite server in communication with the sensor to receive the sensor data from the sensors and in communication with the controllers to transmit control data to the controllers, the onsite server
(Continued)

further including a prediction engine. The onsite server receives sensor data and passes the sensor data through the prediction engine to determine the anticipated environmental conditions within the critical environment and the onsite server transmitting to the controllers to enable the process equipment to effect the environmental conditions.

17 Claims, 14 Drawing Sheets

Related U.S. Application Data

(60) Provisional application No. 63/235,973, filed on Aug. 23, 2021.

(51) Int. Cl.
*G05B 23/02* (2006.01)
*G06Q 50/26* (2024.01)
*G16H 40/20* (2018.01)

(52) U.S. Cl.
CPC .. *G05B 23/0286* (2013.01); *G05B 2219/2614* (2013.01); *G06Q 50/265* (2013.01); *G16H 40/20* (2018.01)

(56) References Cited

U.S. PATENT DOCUMENTS

| | | | |
|---|---|---|---|
| 2019/0234631 A1* | 8/2019 | Wallace | B01L 1/04 |
| 2019/0331409 A1* | 10/2019 | Jung | H04L 12/2825 |
| 2020/0301385 A1* | 9/2020 | Bianchi | G05B 19/042 |
| 2020/0355391 A1 | 11/2020 | Wenzel et al. | |
| 2020/0372743 A1* | 11/2020 | Miller | G07C 9/257 |
| 2021/0381861 A1* | 12/2021 | Brown | G05D 22/02 |
| 2023/0053839 A1* | 2/2023 | Vaislic | G16H 40/20 |

OTHER PUBLICATIONS

Canadian Intellectual Property Office, Canadian Office Action in application No. 3,237,214 (Aug. 20, 2024).

* cited by examiner

SYSTEM, METHOD AND/OR COMPUTER READABLE MEDIUM FOR MONITORING AND PREDICTIVELY CONTROLLING CLOSED ENVIRONMENTS

CROSS-REFERENCE TO RELATED APPLICATIONS

This application is a continuation of International Patent Application No. PCT/CA2022/051272 filed on Aug. 23, 2022, which claims priority to U.S. Provisional Patent Application No. 63/235,973, filed Aug. 23, 2021, both of which are incorporated by reference herein.

TECHNICAL FIELD

The present disclosure relates to a system and method of monitoring and predictively controlling environments, particularly critical environments such as clean rooms.

BACKGROUND

Current state data on critical environments, such as clean rooms, are located in multiple locations. For example, if there are several sensors keeping track of a clean room, the data for each sensor is located in a separate location. This problem grows in complexity when there are multiple critical environments at a single site, or if there are multiple sites, all with multiple critical environments. Data pertaining to each of these sites is not in a central location.

Furthermore, current state diagnostics solely report the changes on a day-to-day basis, and lack information as to why there may be changes to the data throughout the day. As an example, if the temperature in a critical environment was adjusted three times a day, while current state diagnostics would provide the information regarding the adjustments, there would be no information pertaining to the reasoning that the temperature was changed during the day.

In addition, all current systems are considered to be reactionary systems. For example, when maintaining stable environmental conditions, including but not limited to, a stable temperature within a critical environment, current systems will monitor the environmental conditions, such as temperature, within said critical environment, and should there be a change in such conditions said current system that is monitoring the conditions (e.g. temperature, humidity etc.) will compensate. However, given that it is a critical environment, which may house sensitive equipment or products, the maintenance of the environmental conditionals, such as temperature, needs to be as steady state as possible, meaning that if there is any compensation by the current system, it will need to occur quickly. The speed required for the current system to compensate uses a large amount of power, and as such leads to higher cost.

SUMMARY

According to various aspects to the present invention, a system for anticipating environmental conditions within a critical environment needed to maintain a set of established environmental parameters within the critical environment is disclosed. The system includes a process equipment for maintaining the set of established environmental parameters within the critical environment. The system also includes a sensor associated with the critical environment to obtain sensor data about the critical environment. The system further includes a controller operatively connect to the process equipment and controlling the operation of the process equipment. The system also includes a server in communication with the sensor to receive the sensor data from the sensor and in communication with the controller to transmit control data to the controller, the server further including a prediction engine. The server receives sensor data and passes the sensor data through the prediction engine to determine the anticipated environmental conditions within the critical environment based on the sensor data to maintain the established environmental parameters and the onsite server transmitting the control data to the controller to enable the process equipment to effect the environmental conditions needed to maintain the set of established environmental parameters within the critical environment.

The predictive engine may be trained using previously measured sensor data and by one or more artificial intelligence-based modules on sensor data of environment conditions that leads up to the set of established environmental parameters. The predictive engine may also be trained using previously measured sensor data and by one or more artificial intelligence-based modules on fault detection monitoring. The set of established environmental parameters may include temperature, humidity, differential pressure, non-viable and viable particle monitoring, airflow rates throughout the system, and time in use.

The sensor may obtain sensor data from outside the critical environment. The server may be an onsite server. In the alternative, the server may be a cloud hub controller located off site. The critical environment may be a clean room. In the alternative, the critical environment may be a refrigerated room.

According to various aspects of the present invention, a system for anticipating environmental conditions within a plurality of critical environments needed to maintain a set of established environmental parameters within each critical environment is disclosed. The system includes a plurality of process equipment for maintaining the set of established environmental parameters within each critical environment. The system also includes a plurality of sensors associated with each critical environment to obtain sensor data about each critical environment. The system further includes a plurality of controllers operatively connect to the plurality of process equipment and controlling the operation of plurality of process equipment. The system also includes a server in communication with the plurality of sensors to receive the sensor data from the plurality of sensors and in communication with the plurality of controllers to transmit control data to the plurality of controllers, the server further including a prediction engine. The server receives sensor data and passes the sensor data through the prediction engine to determine the anticipated environmental conditions within each critical environment based on the sensor data need to maintain the established environmental parameters and the onsite server transmitting the control data to the plurality of controllers to enable the plurality of process equipment to effect the environmental conditions needed to maintain the set of established environmental parameters within each critical environment.

The predictive engine may be trained using previously measured sensor data and by one or more artificial intelligence-based modules on sensor data of environment conditions that leads up to the set of established environmental parameters. The predictive engine may also be trained using previously measured sensor data and by one or more artificial intelligence-based modules on fault detection monitoring. The set of established environmental parameters may include temperature, humidity, differential pressure, non-viable and viable particle monitoring, airflow rates throughout the system, and time in use.

The plurality of sensors may obtain sensor data from outside each critical environment. The system may further includes a plurality of client devices for displaying a discrepancy between the anticipated environmental conditions within each critical environment and the established environmental parameters.

The server may be an onsite server. In the alternative, the server may be a cloud hub controller located off site. The critical environment may be a clean room. In the alternative, the critical environment may be a refrigerated room.

According to various aspects of the present invention, a system for gathering user activity data in association with user within a critical environment and determining whether the user activity data complies with a set of established user activity parameters is disclosed. The system includes a sensor connected to the critical environment to obtain user activity data of the user in association with the critical environment. The system further includes a client device for displaying an output to the user. The system also includes a server in communication with the sensor to receive the user activity data of the user from the sensor and in communication with the client device to transmit display data as an output to the client device, the server further includes a prediction engine. The server receives sensor data and passes the sensor data through the prediction engine to determine whether the user activity data complies with the set of established user activity parameters and the server transmitting the display data to the client device to enable the user to comply with the set of established user activity parameters.

The predictive engine may be trained using previously measured user activity data and by one or more artificial intelligence-based modules on user activity data that leads up to the set of established user activity parameters. The sensor may include a camera. The server may be an onsite server. In the alternative, the server may be a cloud hub controller located off site. The critical environment may be a clean room.

According to various aspects of the present invention, a system for controlling access to a critical environment based on whether user activity data complies with a set of established user activity parameters is disclosed. The system includes a sensor connected to the critical environment to obtain user activity data of the user in association with the critical environment. The system also includes a client device for displaying an output to the user. The system further includes a server in communication with the sensor to receive the user activity data of the user from the sensor and in communication with the client device to transmit display data as an output to the client device, the server further including a prediction engine. The server receives sensor data and passes the sensor data through the prediction engine to determine whether the user activity data complies with the set of established user activity parameters and the onsite server transmitting the display data to the client device to enable the user to comply with the set of established user activity parameters and granting the user access to the critical environment when the user activity data complies with a set of established user activity parameters.

The predictive engine may be trained using previously measured user activity data and by one or more artificial intelligence-based modules on user activity data that leads up to the set of established user activity parameters. The sensor may include a camera. The server may be an onsite server. In the alternative, the server may be a cloud hub controller located off site. The critical environment may be a clean room.

BRIEF DESCRIPTION OF THE DRAWINGS

Embodiments are described with reference to the following figures, in which.

DETAILED DESCRIPTION OF THE PREFERRED EMBODIMENTS

Figure 1:
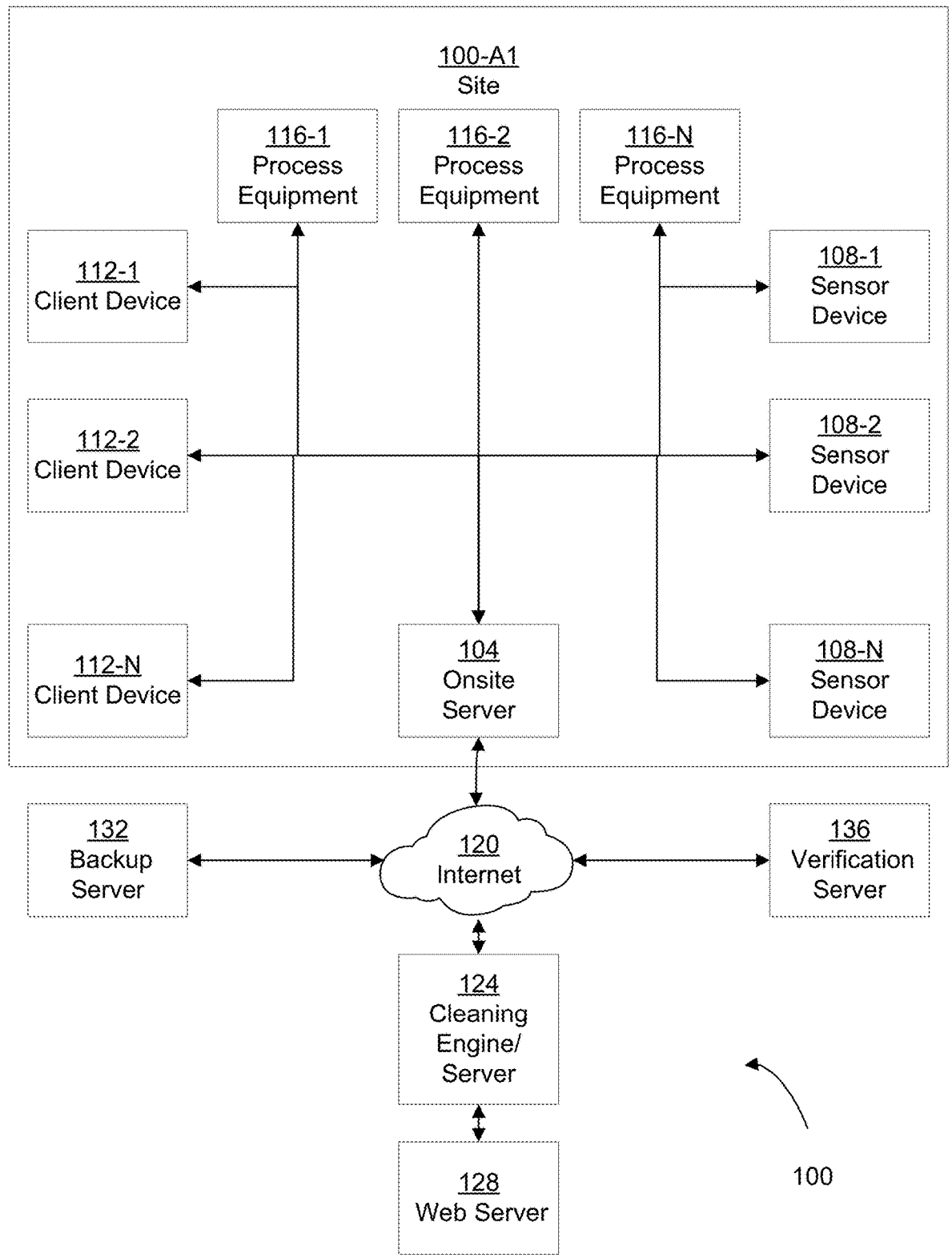
FIG. 1 depicts an example system for monitoring and predictively controlling critical environments for a single site/location.

The description, which follows, and the embodiments described therein are provided by way of illustration of an example, or examples of particular embodiments of principles and aspects of the present invention. These examples are provided for the purposes of explanation and not of limitation of those principles of the invention. In the description that follows, like parts are marked throughout the specification and the drawings with the same respective reference numerals.

It should also be appreciated that the present invention can be implemented in numerous ways, including as method, an apparatus or a system. In this specification, these implementations, or any other form that the invention may take, may be referred to as a processes. It will be understood by a person skilled in the relevant art that in different geographical regions and jurisdictions these terms and definitions used herein may be given different names, but relate to the same respective systems.

Although the present specification describes components and functions implemented in the embodiments with reference to standards and protocols known to a person skilled in the art, the present disclosure as well as the embodiments of the present invention are not limited to any specific standard or protocol. Each of the standards for Internet and other forms of computer network transmission (e.g., TCP/IP, UDP/IP, HTML, HTTP, SSL, and SFTP) represent examples of the state of the art. Such standards are periodically superseded by faster or more efficient equivalents having essentially the same functions. Accordingly, replacement standards and protocols having the same functions are considered equivalents.

Preferred embodiments of the present invention can be implemented in numerous configurations depending on implementation choices based upon the principles described herein. Various specific aspects are disclosed, which are illustrative embodiments not to be construed as limiting the scope of the disclosure. Although the present specification describes components and functions implemented in the embodiments with reference to standards and protocols known to a person skilled in the art, the present disclosures as well as the embodiments of the present invention are not limited to any specific standard or protocol.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. may be here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

A person skilled in the art will understand that the present description will reference terminology from the field of artificial intelligence, including machine learning, and may be known to such a person skilled in the relevant art. A person skilled in the relevant art will also understand that artificial neural networks generally refer to computing or computer systems that are design to mimic biological neural networks (e.g. animal brains). Such systems "learn" to perform tasks by considering examples, generally being programmed with or without task-specific rules. For example, the analysis of sensor data, such systems might learn to predict outcomes based on sensor data, allowing for the system to pre-emptively determine actions, such as the lowering of the temperature within an environment prior to the ambient temperature being raised, if there are trends suggesting that the ambient temperature will be raised. A persons skilled in the art will recognize the different applications of a neural network within said field.

Machine learning techniques will generally be understood as being used to identify and classify specific reviewed data. Machine learning approaches first tend to involve what is known in the art as a "training phase". In the context of classifying functions, a training "corpus" is first constructed. This corpus typically comprises a set of known data. Each set is optionally accompanied with a "label" of its disposition. It is preferable to have fewer unknown samples. Furthermore, it is preferable for the corpus to be representative of the real world scenarios in which the machine learning techniques will ultimately be applied. This is followed by a "training phase" in which the data together with the labels associated with the data, files, etc. themselves, are fed into an algorithm that implements the "training phase". The goal of this phase is to automatically derive a "generative model". A person skilled in the relevant art will understand that a generative model effectively encodes a mathematical function whose input is the data and whose output is also the data. By exploiting patterns that exist in the data through the training phase, the model learns the process that generates similar trends in sensor data, indicating when an incident may occur within an environment, or when environmental conditions will change. A generative machine learning algorithm should ideally produce a generator that is reasonably consistent with the training examples and that has a reasonable likelihood of generating new instances that are similar to its training data but not identical. Specific generative machine learning algorithms in the art include the Autoregressive Recurrent Neural Networks, Variational Auto-Encoders, Generative Adversarial Neural Networks, Energy-Based Models, Flow-Based Neural Networks, and others known in the art. The term generator is also used to describe a model. For example, one may refer to a Recurrent Neural Network Generator. Once the model/generator is established, it can be used to generate new instances, scenarios or data sets that are presented to a computer or computer network in practice.

None of the prior art provides a complete solution for the aggregation of all sensor data, providing reporting of the maintenance of critical environments, and the reasons why changes to the environmental conditions had to be made. In addition, none of the prior art acts as a pre-emptive system, and are solely reactionary systems. The below embodiment aims to solve at least one of the aforementioned problems described above. In a preferred embodiment of the present invention, there is provided an anticipatory system that can attempt to react to environmental conditions.

By way of general overview, there is provided a system and method of monitoring multiple critical environment sites, and aggregating the data from said critical environment sites, where the data may be used to report on the reasons for adjusting environmental conditions, and where the data may also be sent to a prediction engine to determine future adjustments to expected or predicted environmental conditions (e.g. anticipatory adjustments), hence allowing for the gradual adjustments to the environment to save power, reduce costs, increase reaction time, etc.

The prediction engine (using artificial intelligence and neural net technology) may also provide "action hooks" based on the predicted/current environmental state. A person skilled in the art will understand that "action hooks" refers to an interface present in the code that allows for additional customized programming, such as code to send alerts, emails and such. Alternatively, the prediction engine may also present with an interface that allows for API calls to pull information to perform actions. The action hooks may include sending messages, adjusting room conditions, doing alerts, emails, text messages, or other system actions.

The monitoring of the critical environmental sites may also include the monitoring of safety within said critical environmental sites. Such life safety integration would relate to incidents like a fire or an acid spill inside the critical environmental site. Similarly, detection of any incidents would lead to providing action hooks allowing the system to send alarms or messages to client devices for awareness as well as updating an incident log.

The system also includes a fault detection application that reviews data for any deviation and/or trend/alert values in the data collected by one or more relevant sensors prior to sending the data through the prediction engine or providing action hooks.

FIG. 1 depicts system 100. System 100 provides real-time performance monitoring of environmental conditions and additional process conditions related to the activities within the controlled environments for a single site 100-A1. In the current embodiment, system 100 is for the monitoring of a single critical environment, or a single site. A critical environment may be any form of room, or any form of enclosed space where the environment needs to be closely monitored as the goods, products or items within the critical environment may be sensitive to environmental changes. A person skilled in the art will understand that a critical environment refers to environments where failure or disruption of maintaining steady state of the environment would lead to a serious loss in goods, products, or items within said critical environment, or may even lead to potentially dangerous situations where personnel within said critical environments may be exposed to life threatening or harming agents should said critical environment not have its environmental conditions maintained. Examples of critical environments that may be monitored by system 100 include clean rooms, labs, or refrigeration units. System 100 includes an onsite server 104, a plurality of sensors 108-1, 108-2 . . . 108-N, a plurality of client devices 112-1, 112-2 . . . 112-N, a plurality of process equipment 116-1, 116-2 . . . 116-N. (Sensors 108 are referred to herein generically as sensor 108 and collectively as sensors 108. This nomenclature is used elsewhere herein).

Onsite server 104, also referred to herein as node 104, may also be connected to backup server 132, verification server 136 through internet 120. Furthermore, onsite server 104 is also connected to anonymous web server 128 and cleaning engine 124 through internet 120. Onsite server 104 can be defined as the server that is within proximity, or in the same location as the controlled environment.

A controlled environment may include an access control system for maintaining a critical environment within applicable parameters by controlling environmental conditions and/or access and egress thereto. Examples of environmental conditions within the critical environment include temperature, humidity, differential pressure, non-viable and viable particle monitoring, airflow rates throughout the system, or time in use.

Examples of controlled environments include facilities that are a part of regulated industries that require batch records, such as facilities for pharmaceuticals, biotech therapeutics, vaccines, nuclear medicines & diagnostics, high potent compounds, cell therapies, personalized medicines (i.e. STEM cell therapies), nutraceuticals, and food. Other examples of controlled environments include facilities for clean manufacturing industries that require facility monitoring, such as those for the manufacturing of electronics, nuclear medicine, nuclear power, and medical devices. Controlled environments may also be used in research facilities for bio-safety containment labs (CL2, CL3, CL4/BSL2, BSL3, BSL 4 (Containment levels in Canada, and BioSafety Level in the USA), nanotechnologies, neutrino research to monitor background conditions of experiments, university and college research facilities, and innovation/incubation hubs (where experiments may require background conditions to be monitored and correlated against experimental activities).

Onsite server 104 may be implemented with computer systems or mobile devices which are well known in the art. Generally speaking, computers and mobile devices include a central processor, system memory and a system bus that couples various system components (typically provided on cards), including the system memory, to the central processor. A system bus may be any of several types of bus structures including a memory bus or memory controller, a peripheral bus, and a local bus using any of a variety of bus architectures. The structure of a system memory may be well known to those skilled in the art and may include a basic input/output system (BIOS) stored in a read only memory (ROM) and one or more program modules such as operating systems, application programs and program data stored in random access memory (RAM). Computers and mobile devices may also include a variety of interface units and drives for reading and writing data. A user can interact with the computer or mobile device with a variety of input devices, all of which are known to a person skilled in the relevant art. Computers or mobile devices can operate in a networked environment using local connections to one or more remote computers or other devices, such as a server, a router, a network personal computer, a peer device or other common network node, a wireless telephone or wireless personal digital assistant.

Figure 4:
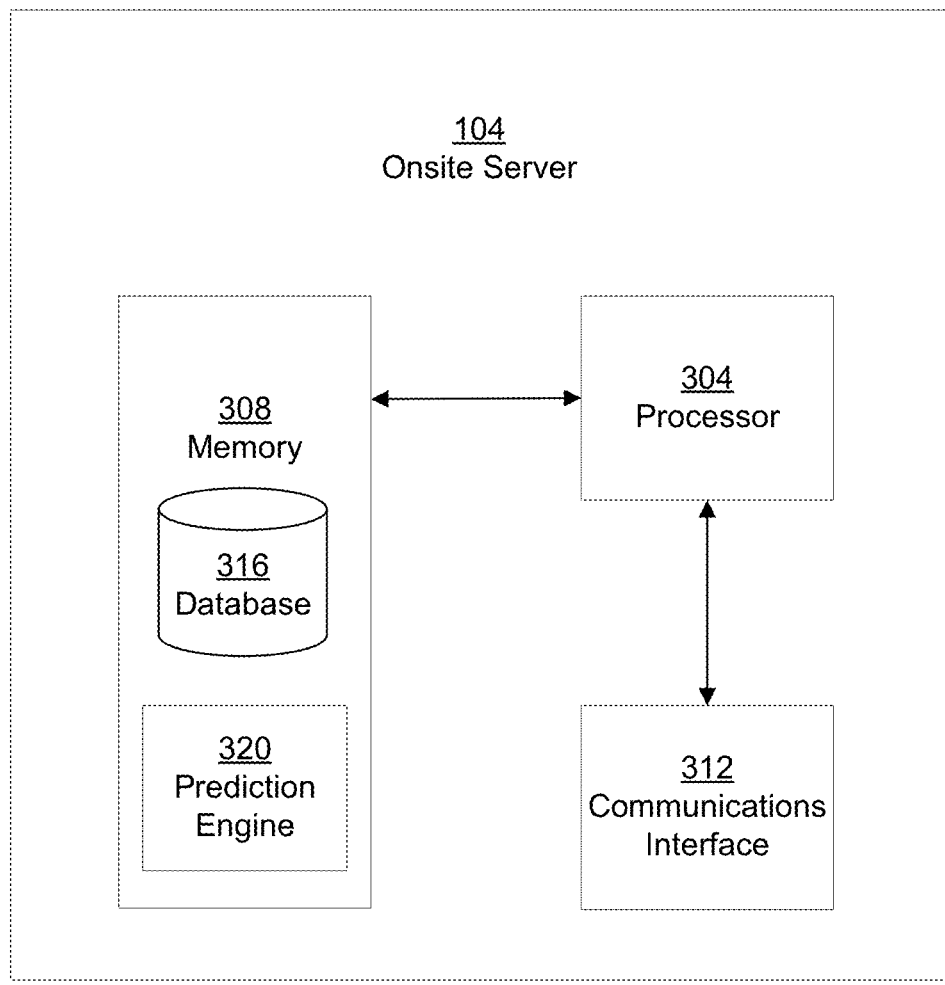
FIG. 4 depicts an example onsite server of FIG. 1.

As shown in FIG. 4, onsite server 104 includes a processor 304 interconnecting a memory 308 and a communications interface 312. Processor 304 may include a central processing unit (CPU), a microcontroller, a microprocessor, a processing core, a field programmable gate array (FPGA), or similar. Processor 304 may include multiple cooperating processors. Processor 304 may cooperate with a non-transitory computer-readable medium such as memory 308 to execute instructions to realize the functionality discussed herein.

Memory 308 may include a combination of volatile (e.g. Random Access Memory or RAM) and non-volatile memory (e.g. read-only memory or ROM, Electrically Erasable Programmable Read Only Memory or EEPROM, flash memory). All or some of the memory 308 may be integrated with processor 304. Memory 308 stores computer readable instructions for execution by processor 304.

In particular, memory 308 stores a plurality of applications, each including a plurality of computer-readable instructions executable by processor 304. The execution of the instructions by processor 304 configures onsite server 104 to perform various actions discussed herein. In particular, the execution of instructions in memory 308 by processor 304 determines the actions that may occur as a result of sensor readings from the critical environment being monitored. A person skilled in the art will recognize that various forms of computer-readable programming instructions stored in memory 308 can be executed by processor 304 as applications or queries.

Memory 308 further includes a database 316. Database 316 is a log database which houses time-stamped entries of sensor data from sensors 108. For example, database 316 may include time-stamped entries of the temperature in a clean room throughout the day. The system may log entries through multiple methods, and may also log entries in a method that is compliant with auditing purposes. For example, within the Code of Federal Regulations, Title 21, Part 11, ("CFR21, Part 11") there are requirements and standards pertaining to record keeping. The system may log entries in a method that is within scope of CFR 21, Part 11. Furthermore, the system may log entries for the purposes of using as training sets or models for prediction engine 320. The system may also make use of anomaly detection and logging, prompting the administration to enter what occurred in an event/anomaly, and outlining why it occurred. Furthermore, for auditing and compliance purposes, all sensor data may be recorded. The recording of all sensor data also allows for post-incident analysis, as an incident may occur at any time, and by recording the sensor data prior to the incident, the data may provide training data for prediction engine 320 to prevent similar incidents in the future. The prediction engine 320 will be further discussed below.

Memory 308 further includes a fault detection condition monitoring system that may detect and remove any data from sensors that may be considered to be collected in error (possibly due to a malfunctioning sensor), or any data that when collected appears to be an outlier. For example, if a sensor is continuing to provide data that appears to be faulty over a predetermined period of time, then an alert may be sent out to specific users indicating that said sensor may be faulty and may need replacing. In another example, in a refrigerated environment where a compressor is used, sensors may be recording the amperage of the compressor. If the amperage of said compressor exceeds the threshold for a period of 30 minutes, then an alert may be sent out indicating that the compressor may be faulty, or where the compressor may need further maintenance (e.g. it may be a dirty compressor). A person skilled in the art will recognize the different conditions that a fault detection condition monitoring system may detect.

Memory 308 further includes a prediction engine 320. The prediction engine 320 includes one or more artificial intelligence-based modules, or neural network modules. Each artificial intelligence-based module aids in the prediction and analysis of sensor data received from sensors 108. In the current embodiment, each artificial intelligence-based module may be used for the prediction and analysis of different data and/or used for different functionality. For example, a first artificial intelligence-based module may be used for the prediction of ambient and external environmental conditions that may affect the environmental conditions within a controlled environment, while a second artificial intelligence-based module may be used to determine whether a user entering the controlled environment is properly gowned up, and/or whether said user has any exposed skin. These examples will be further discussed below, however, may be referred to as using prediction engine 320 as a whole. A person skilled in the art will recognize that despite referring to prediction engine 320 as a whole, individual artificial intelligence-based modules may be used. In the current embodiment, Microsoft Azure artificial intelligence models are used, however a person skilled in the art will recognize that other artificial intelligence models may be used, such as Google artificial intelligence models.

A person skilled in the relevant art will understand that the AI based or algorithmic processes of the present invention may be implemented in any desired source code language, such as Python, Java, and other programming languages and may reside in private software repositories or online hosting service such as Github. A person skilled in the relevant art will understand that the term "deep learning" refers to a type of machine learning based on artificial neural networks. Deep learning is a class of machine learning algorithms (e.g. a set of instructions, typically to solve a class of problems or perform a computation) that use multiple layers to progressively extract higher level features from raw input. For example, in image processing, lower layers may identify edges, while higher layers may identify human-meaningful items such as digits or letters or faces.

The prediction engine 320 may also analyze, review, and infer various events in the system based on past data and recorded outcomes. For example, by training the prediction engine 320 to determine the sensor data of the ambient environment that leads up to a high ambient temperature, the prediction engine 320 may be able to detect when to expect high ambient temperatures, hence pre-emptively providing suggestions and/or action hooks to lower the temperature in the controlled environment before the ambient temperature being raised. In another example, integration of 3rd party data, i.e., weather network data, may be used by the prediction engine 320 to adjust the indoor environmental condition of controlled environments pre-emptively for energy efficiency purposes. In this way the AI is trained to trace and learn from system events and will create action hooks to allow for remediation, alerts and other system functions to occur.

Prediction engine 320 may also be used for pre-emptive fault detection monitoring. Referring to the example above regarding the compressor in a refrigerated environment, prediction engine 320 may be trained to review sensor data leading up to the failure of the compressor/the compressor malfunctioning or needing maintenance (e.g. becoming dirty). The data reviewed may not be limited to just the amperage of the compressor, but may also include the temperature data within the refrigerated environment. Prediction engine 320 may then learn how to predict when a dirty compressor may occur, and pre-emptively alert users, hence reducing any downtime of equipment and lowering the risk of product going bad within the refrigerated environment. A person skilled in the art will recognize the different scenarios where prediction engine 320 may be used for pre-emptive fault detection monitoring.

Onsite server 104 also includes communications interface 312 interconnected with processor 304. Communications interface 312 includes suitable hardware (e.g. transmitters, receivers, network interface controllers and the like) allowing onsite server 104 to communicate with other computing devices, such as client devices 112. The specific components of communications interface 312 are selected based on the type of network or other links that onsite server 104 is required to communicate over.

System 100 can also include input devices that connect to processor 304, such as a keyboard and mouse, as well as output devices, such as a display. Alternatively, or in addition, the input and output devices may be connected to processor 304 via communications interface 312 via another computer device. In other words, input and output devices can be local to onsite server 104 or remote.

In the current embodiment, sensors 108 may be examples of input devices connected to processor 304 in onsite server 104 via communications interface 312. Sensors 108 may be located throughout the facility and within the controlled environments as well. Sensors 108 that are located inside the controlled environments may take measurements of the environmental conditions within the controlled environments, while sensors 108 that are located throughout the remainder of the facility may take measurements outside the controlled environments. Measurements outside the controlled environment may include measurements outside the building that houses the controlled environment, as the outside weather and outdoor conditions may impact the controlled environment. Memory 308 of onsite server 104 may further include definitions for the set point and calibration for sensors 108.

Examples of sensors 108 include sensors that measure or record temperature, humidity, differential pressure, non-viable and viable particles counter, video, face recognition, voice recognition, occupancy, RFID, door contacts, magnetic locks, access control, vibration, chemical, heat mapping, airflow, equipment data and alarms, and system health monitoring. Other examples of sensors 108 may also include fire and gas sensor detection including: $CO_2$, hydrogen, or oxygen level, and air quality parameters in the environment. A person skilled in the art will recognize the availability of different input and output devices and that there are a variety of methods of connecting to processor 304.

Data that is sent from sensors 108 to processor 304 of onsite server 104 is used for analysis and to provide action hooks or an interface for API calls to perform further actions. Action hooks allow for other applications to pull information, so as to perform their own functions, such as sending emails, alerts, etc. Specifically, the creation of action hooks allow for various events, including, but not limited to locking/unlocking doors, displaying safety messages on the systems, sending alerts, creating alarms, and recording an abnormality in database 316. The type of data that is recorded and sent from sensors 108 to processor 304 is dependent on the type of sensor. For example, a temperature sensor may send temperature data to processor 304, whereas a camera as a sensor may send images and video back to processor 304. A person skilled in the art will recognize the different types of data that may be sent from sensors 108 to processor 304 to be analyzed and reviewed.

In the current embodiment, process equipment 116 (see FIG. 1) may be examples of output devices connected to processor 304 in onsite server 104 via communications interface 312. Process equipment 116 may be located throughout the facility and within the controlled environments as well. Process equipment 116 may include controllers or other forms of equipment used for controlling or maintaining the environment within the controlled environment. For example, process equipment 116 may be a thermostat controlling an HVAC system or may be dust filters controlling the intake and removal of dust. Processor 304 may act as a controller to change the temperature of a control environment or may adjust the air circulation of the controlled environment to maintain proper environmental conditions. A person skilled in the art will understand that process equipment 116 will have a controller associated with it, e.g. disposed within the unit, attached to the unit or as part of a controlling server. A person skilled in the art will also recognize the different process equipment 116 available in connection with onsite server 104 for the maintenance and control of environmental conditions in controlled environments.

Figure 5:
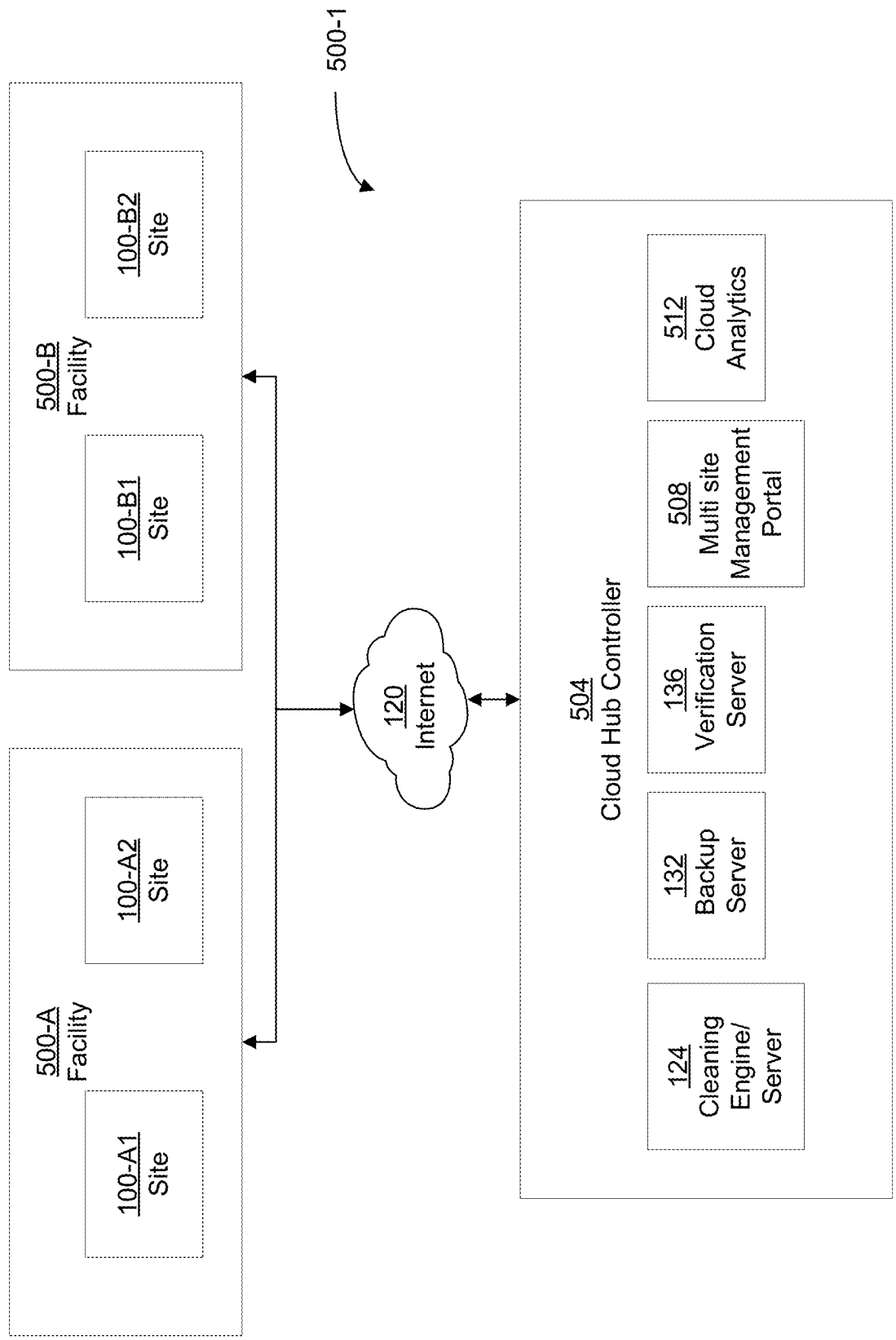
FIG. 5 depicts an example system for monitoring and predictively controlling critical environments for multiple sites/facilities.

Process equipment 116 may be controlled by sending control data to the controller of the process equipment 116, where the control data includes instructions on any changes to the environmental conditions. For example, where process equipment 116 is a thermostat and an HVAC system, control data may include instructions to change the temperature. Control data may originate from processor 304 on onsite server 104, or from cloud hub controller 504 (FIG. 5). Instructions from client devices 112 or multi site management portal 508 (FIG. 5) may also be converted to control data by processor 304 on onsite server 104, or cloud hub controller 504 to be sent to the controller of process equipment 116. A person skilled in the art will recognize the different variations in control data depending on the process equipment 116, and will also recognize the different available components that may send control data.

Onsite server 104 can be a computer device such as, but not limited to, a desktop computer, a laptop computer, a server or a kiosk. In preferred embodiments, onsite server 104 is a server. In other embodiments, applications or components from memory 308 may be placed in separate servers. For example, database 316 and prediction engine 320 may be placed in separate servers.

System 100 further includes client devices 112. Client devices 112 may also be a computer device, such as, but not limited to, a desktop computer, a laptop computer, a server, a kiosk, a mobile device or a tablet. Client devices 112 allow users to monitor onsite server 104, but are not limited in their own location. Users may use client devices 112 from any location, as long as they can be connected to onsite server 104. In the current embodiment depicted in FIG. 1, client devices 112 are shown to be on site, and are hence connected to onsite server 104 locally. However, it will occur to a person skilled in the art that client devices 112 may connect to onsite server 104 remotely or via a network or the internet.

Client devices 112 may further allow users to access database 316 to view the time-stamped logs of data collected from sensors 108. In addition, client device 112 may allow users to control the backup of database 316 to backup server 132, or the upload of data to the web server 128 via an immutable process. This will be further discussed below.

Client devices 112 may also allow users to control process equipment 116 and affect the environmental conditions of the controlled environment. For example, client devices 112 may be able to set the temperature of the controlled environment through a connection with onsite server 104. Client devices 112 may also create and control templates for various processes and the necessary environmental conditions, allowing the activation of templates for certain processes. For example, if the storage of vaccines requires a certain temperature, then a template can be created for the storage of vaccines, and it can be activated through client devices 112 either manually, or by programming triggering conditions to activate the template (e.g. a template activated by time, or the detection of RFID that is coupled with vaccines).

As previously indicated, client device 112 may be implemented as any suitable one of a mobile device (e.g. a smartphone, a tablet computer, a laptop computer or the like), a desktop computer and the like. All-access to onsite server 104 and any additional functions, including, but not limited to the functions previously described, may be managed by user accounts, hence granting permissions to specific users to perform specific functions.

In another embodiment, client device 112 may be located within the controlled environment and easily viewable to users within the controlled environment. FIGS. 7 to 14 provide examples of this. As can be seen in screenshots 700, 800, 900, 1000, 1100, 1200, 1300 and 1400, the layout of the screens are designed to be highly flexible, and allow the user to know the status of the room. Client device 112 may allow for users to provide verbal commands as inputs and display general information and procedures as outputs. Additionally, data regarding procedures for the gathering of sensor data may be further provided. An example that will be discussed below includes the gathering of data regarding users gowning up to detect any exposed skin. Procedures on how to gather the data, such as providing different angles for cameras to capture, or procedures on how to gown up (in a clean room), may be displayed on the screen of client device 112.

Screenshots 700, 800, 900, 1000, 1100, 1200, 1300 and 1400 are setup in a grid system, allowing a variety of widgets to be placed throughout the screen in a wide variety of arrangements. A person skilled in the art will recognize that in addition to the potential variety of arrangements when in a grid system, that there are also numerous other methods of displaying information on a display on client device 112.

Figure 7:
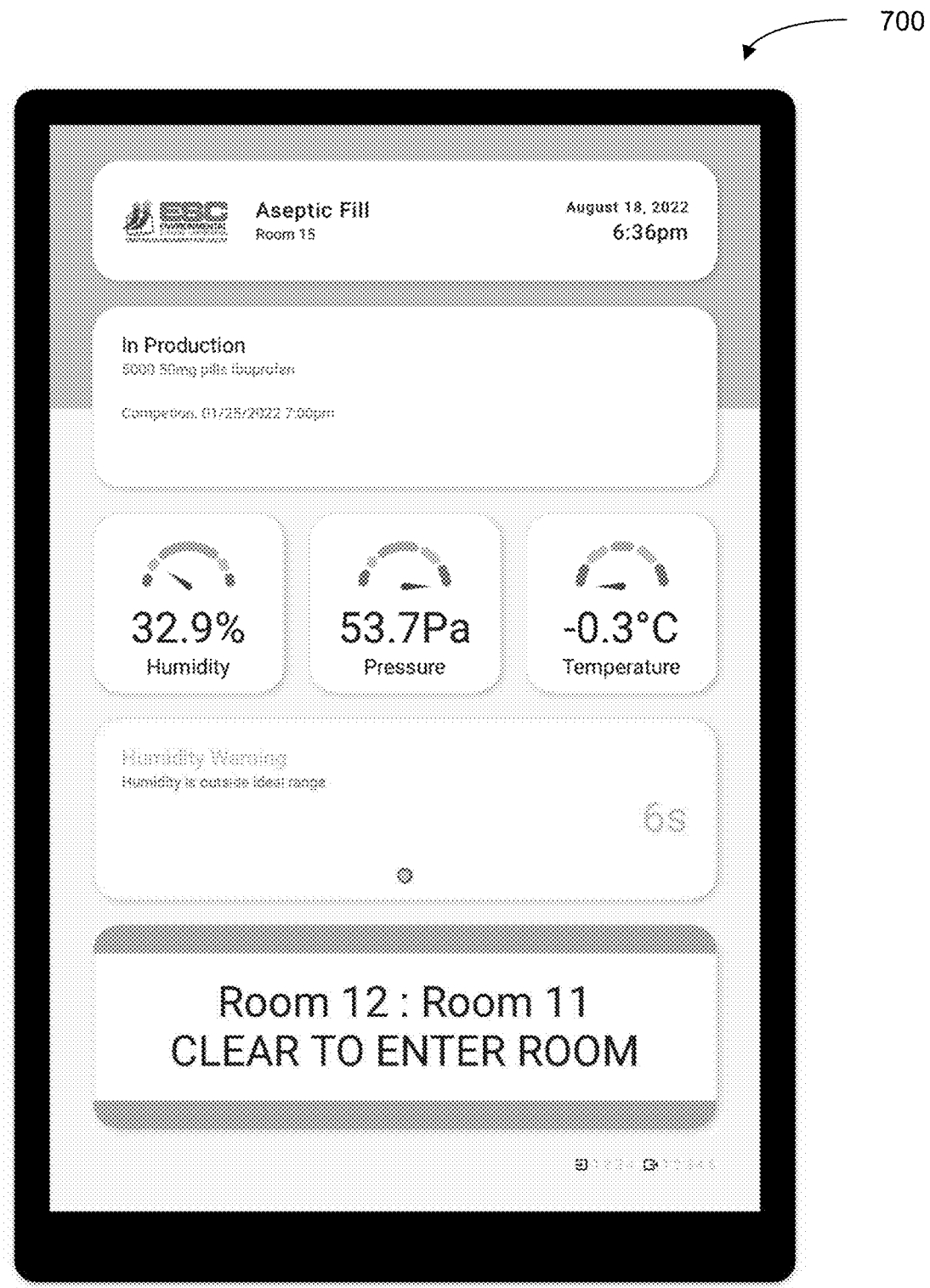
FIGS. 7 to 14 depict example screenshots of client devices located within the critical environment.
Figure 8:
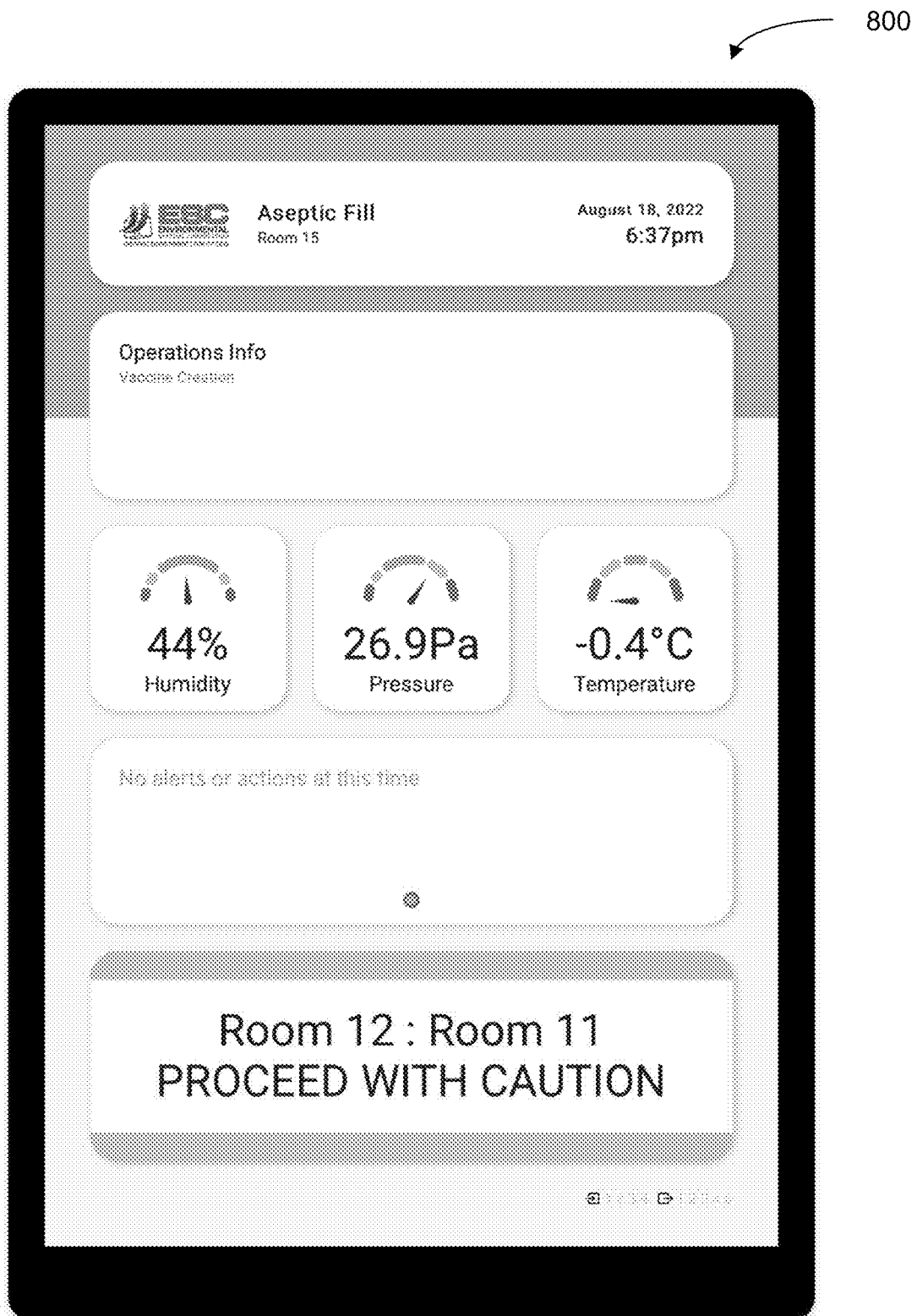
Figure 9:
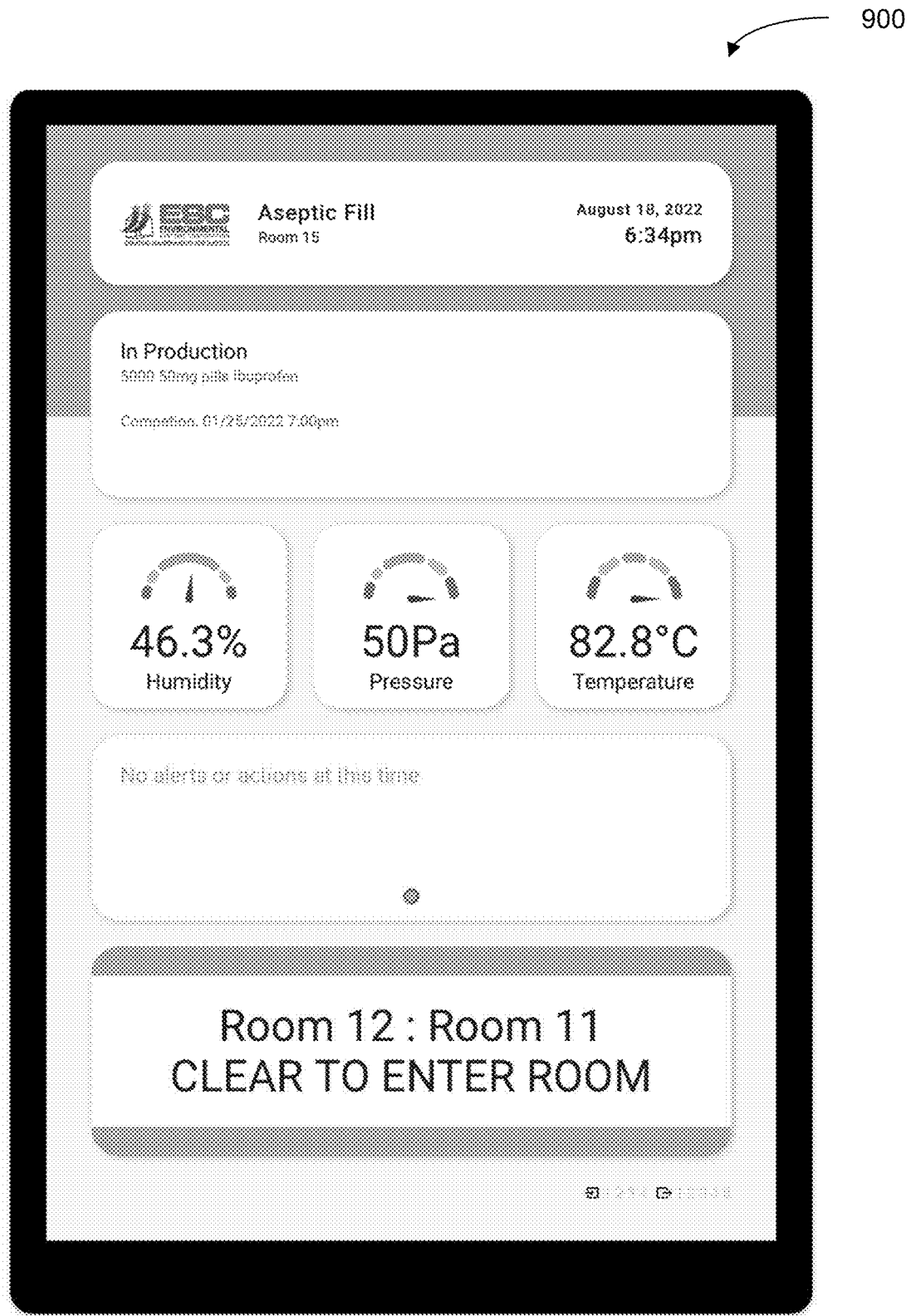
Figure 10:
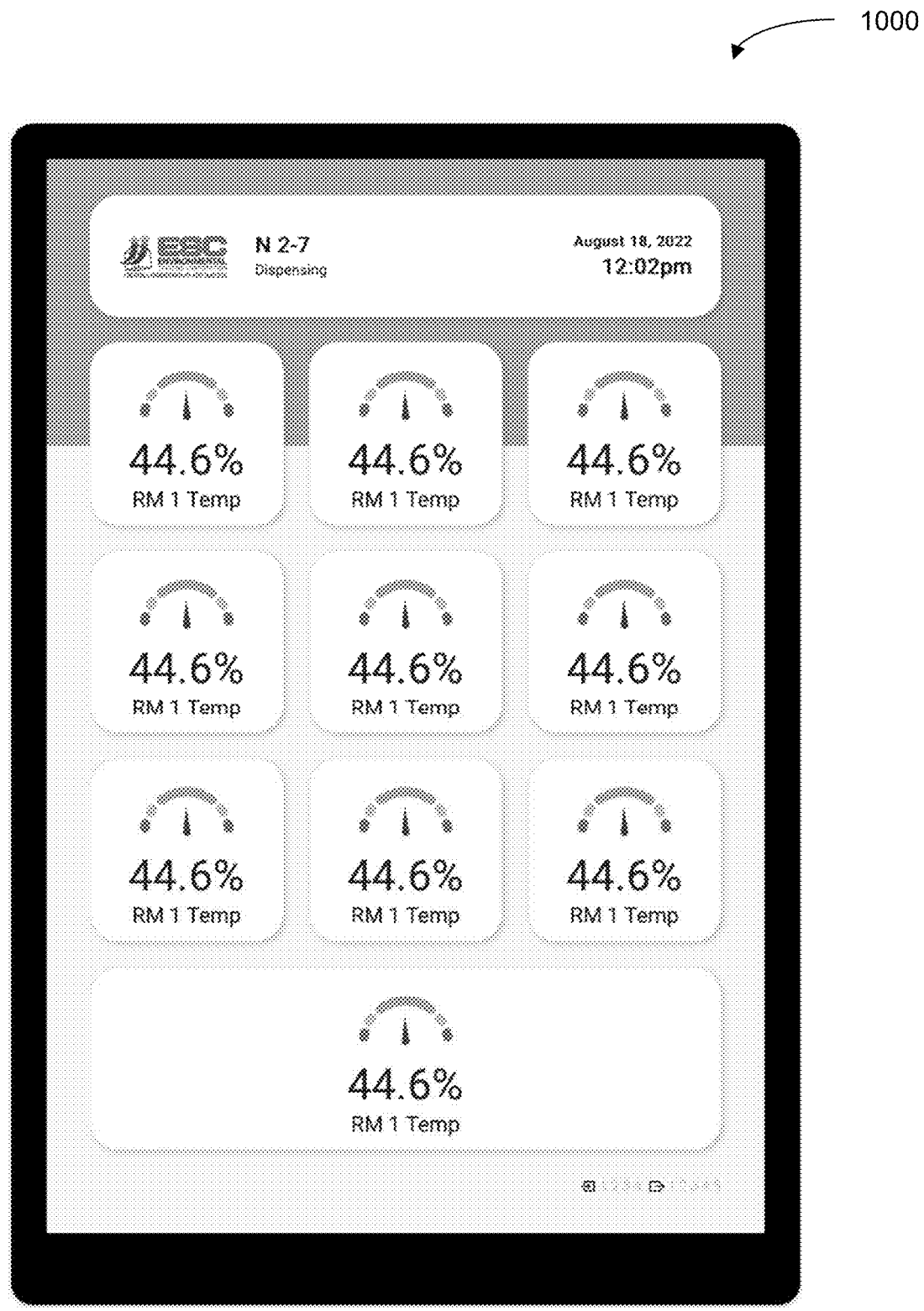
Figure 11:
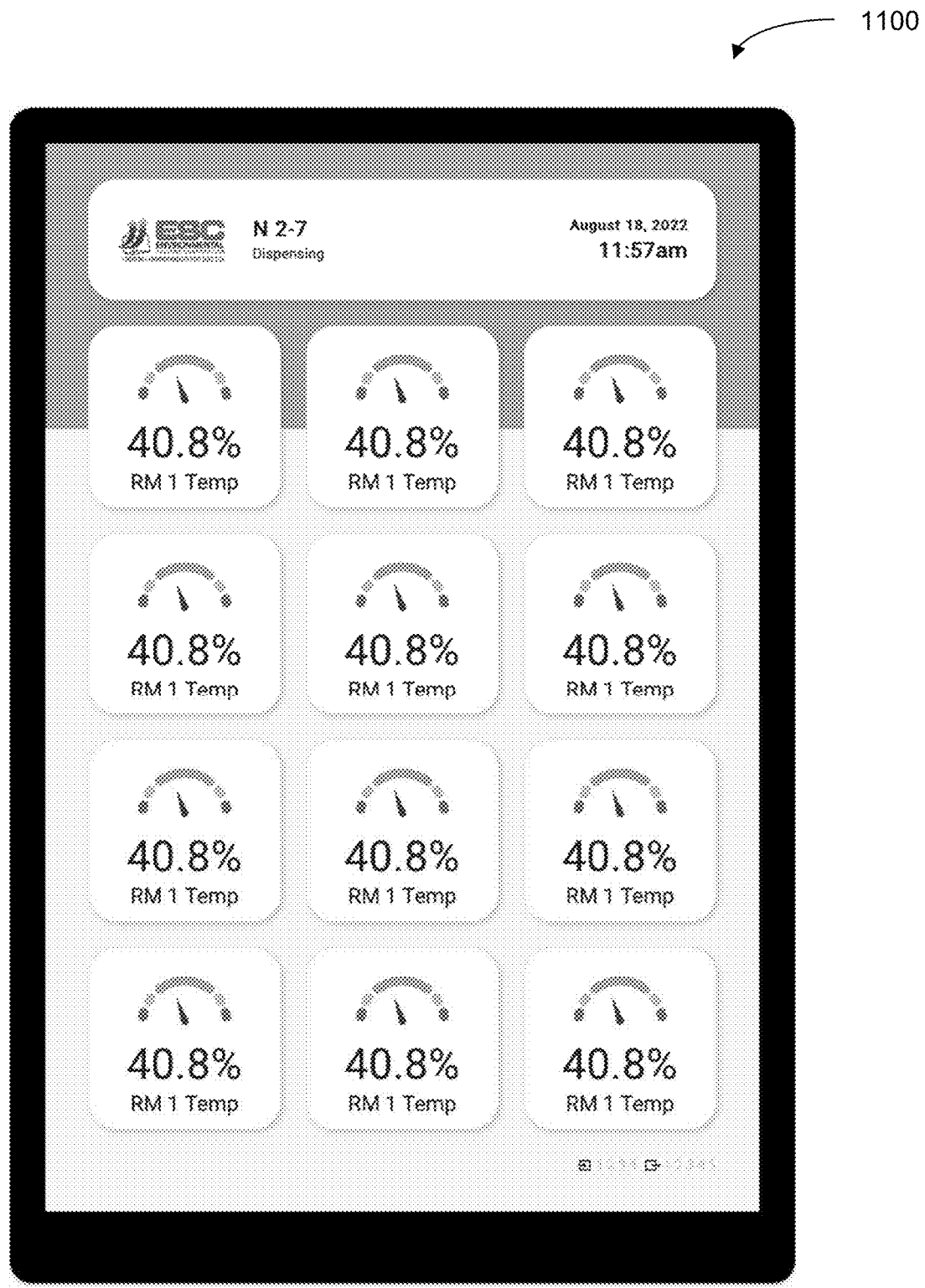
Figure 12:
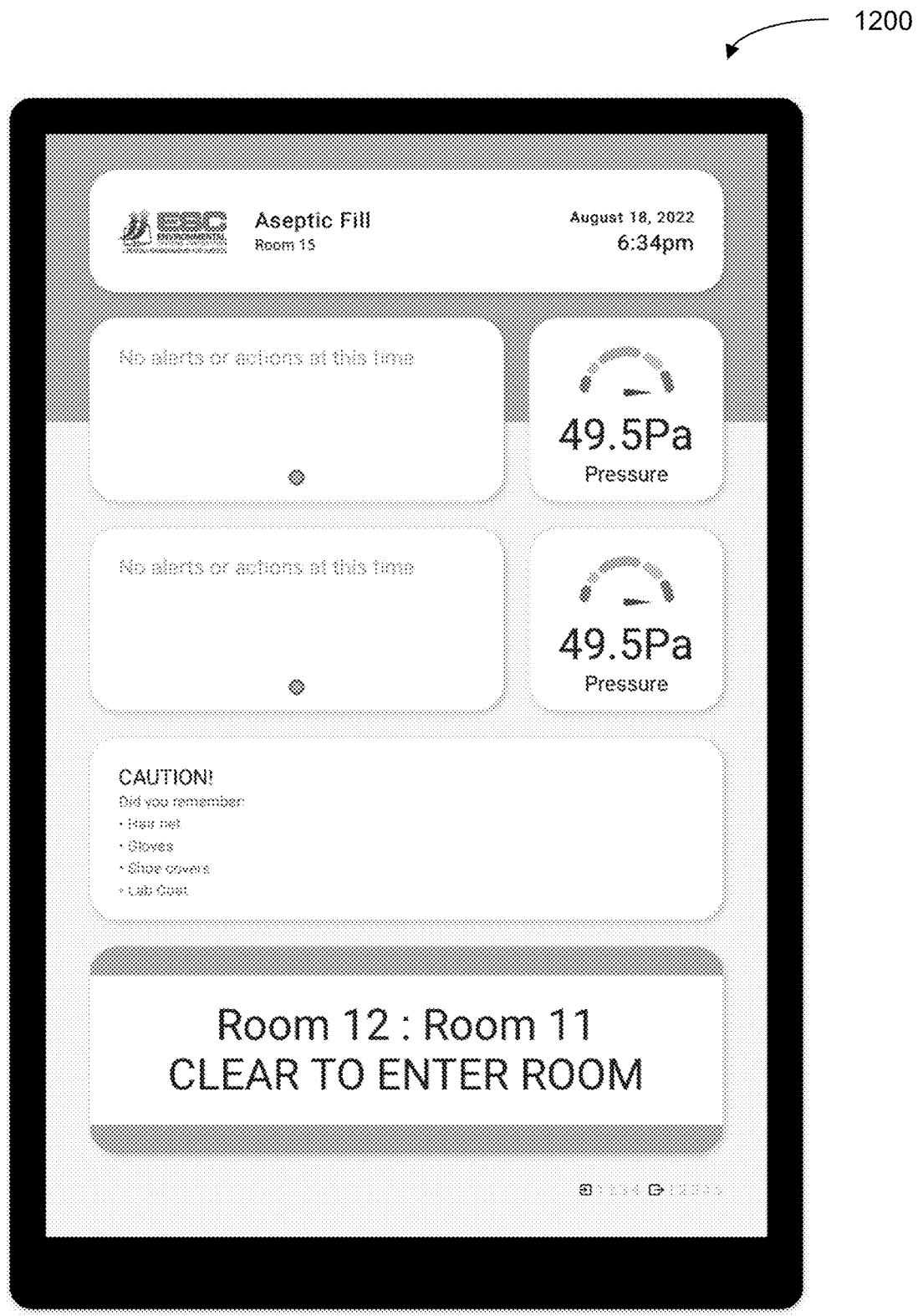
Figure 13:
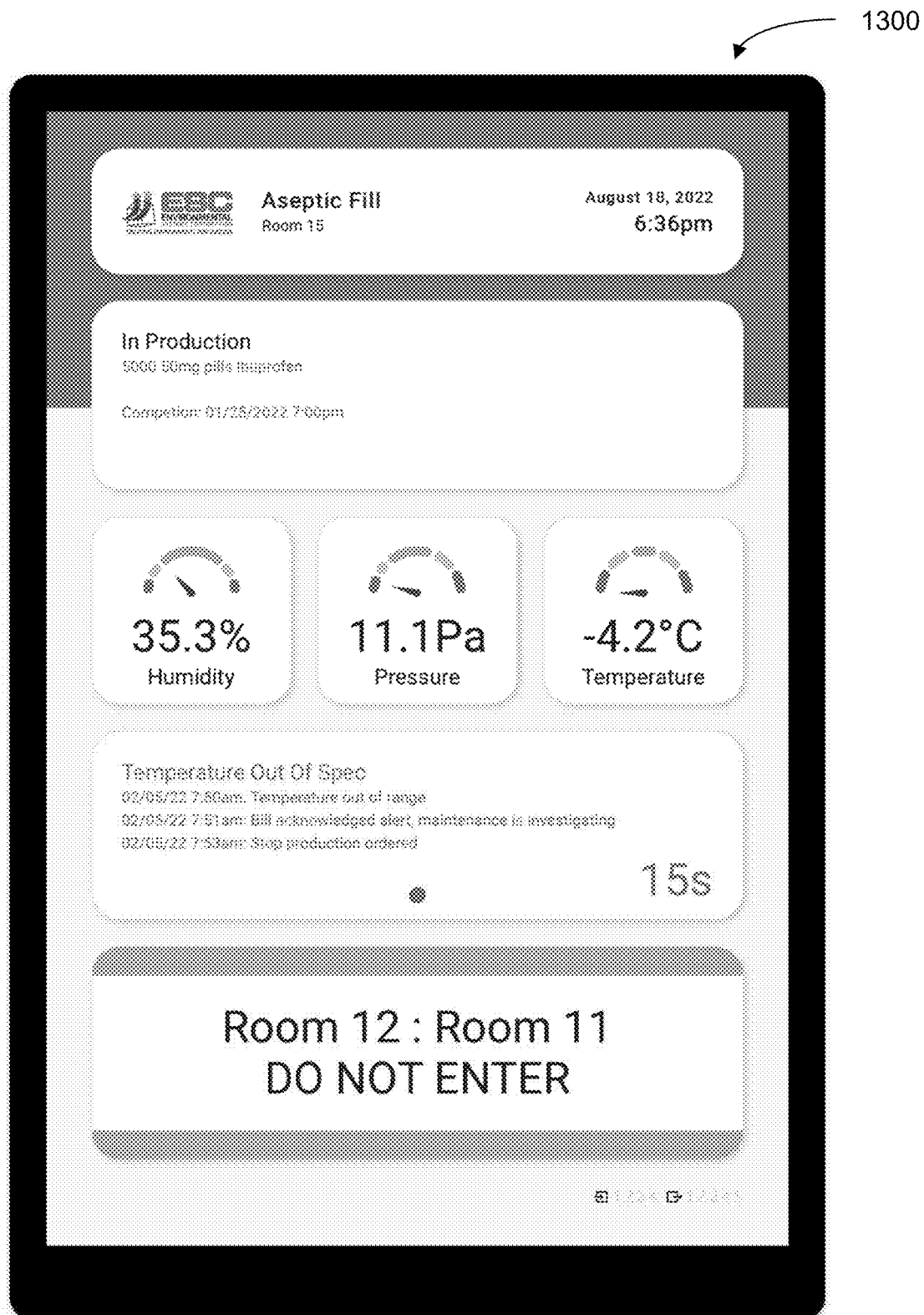
Figure 14:
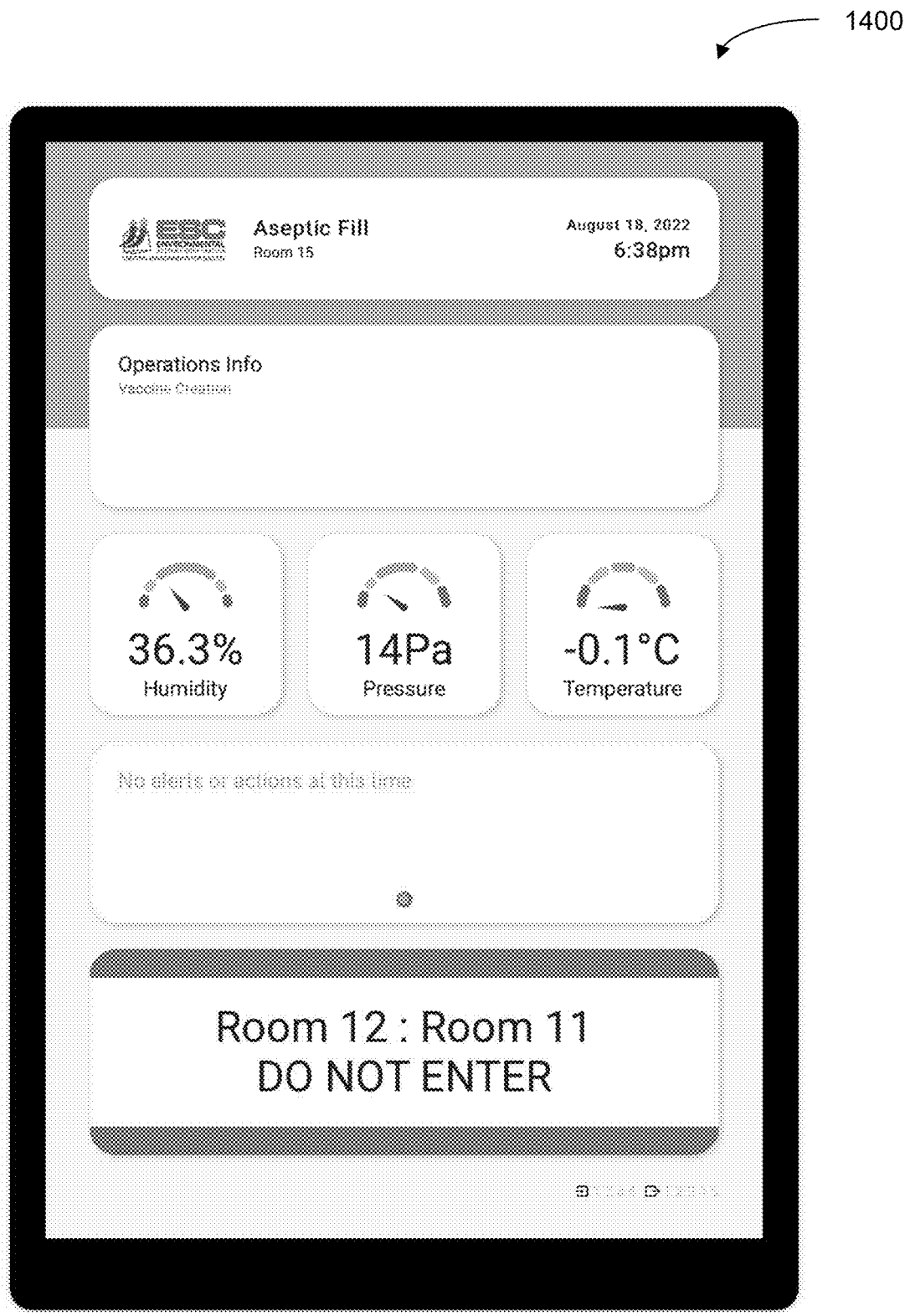

For example, in FIG. 7, screenshot 700 shows the status of the room, along with readings for various sensors 108. Furthermore, warnings are also provided, along with the status of the goods or items within the controlled environment. In another example, in FIG. 10, screenshot 1000 shows additional readings for various sensors 108. In another example, in FIG. 13, screenshot 1300 shows that temperature is out of spec, and that production has stopped as a result. Screenshot 13 also indicates to users that the room may not be entered due to the temperature being out of spec.

Onsite server 104 is connected to backup server 132, verification server 136 and web server 128 through internet 120 (see FIG. 1). Internet 120 is an example implementation of the connection between onsite server 104 and the aforementioned servers. A person skilled in the art will recognize that internet 120 is not limited in its configuration. For example, internet 120 may be implemented as a wide area network or as a local area network. Any desired levels and types of security and encryption protocols that are contemplated may be implemented.

Backup server 132 contains a replicated copy of database 316. In the event that onsite server 104 is no longer operational (possibly due to an incident), backup server 132 will continue to contain the data in database 316, ensuring that data is available. In the current embodiment, the data is backed up in a live fashion. Backup server 132 is ideally located at a different location than onsite server 104. If any large-scale incidents (such as power outages, or natural disasters) occur at the location of onsite server 104, backup server 132 will remain unaffected.

Verification server 136 contains specification data on processes and the corresponding environmental conditions or environmental ranges. This allows onsite server 104 to determine whether or not received sensor data from sensors 108 is within compliant ranges. If the sensor data is not within the compliant ranges, then an incident may be logged in database 316. In alternate embodiments, specification data on processes and the corresponding environmental conditions or environmental ranges may be stored in memory 308 on onsite server 104, and processor 304 may verify sensor data received from sensors 108 against the environmental ranges in memory 308. Data that is verified, or found to be outside of the compliant ranges is also logged in database 316 through a trackable transaction of data with an immutable process, for validation which is required in the specific regulated industries for audit purposes.

Web server 128 (also referred to herein as data lake 128) allows for the storage of anonymized log data and multiple customers' data stripped of its identifying information for analysis. Having log data available allows for the analysis of the effectiveness of different models of maintaining controlled environments, or the advantages of certain geographical locations for specific processes. In addition, particular models or processes may have power savings, which may be analyzed and applied to other controlled environments. The data may also be used as training sets to train prediction engine 320 to recognize trends. The data that may be stored in web server 128 or the data lake may also be used for the training of prediction engine 320 through incident reporting.

Prior to uploading log data to web server 128, the log data may be cleaned using cleaning engine 124. In the current embodiment, cleaning engine 124 may be an alternate server at a similar location to web server 128, or more specifically, cleaning engine 124 may be local with web server 128. However, in other embodiments, cleaning engine 124 may be on the same server as web server 128, or may be located as an alternate server onsite with onsite server 104, or may further be located as an application within onsite server 104. A person skilled in the art will recognize the different configurations and layouts in which cleaning engine 124 may be accessed.

Referring to FIG. 5, in embodiments where there may be more than one critical environment, or more than one controlled environment, the processing of data and the functions provided by onsite server 104 may be performed by cloud hub controller 504. In the current embodiment as depicted in layout 500-1, cloud hub controller 504 may perform functions on behalf of sites 100-A1 and 100-A2 in facility 500-A, and sites 100-B1 and 100-B2 in facility 500-B. Similar to onsite server 104, cloud hub controller 504 may be with computer systems or mobile devices which are well known in the art. Generally speaking, computers and mobile devices include a central processor, system memory and a system bus that couples various system components (typically provided on cards), including the system memory, to the central processor. A system bus may be any of several types of bus structures including a memory bus or memory controller, a peripheral bus, and a local bus using any of a variety of bus architectures. The structure of a system memory may be well known to those skilled in the art and may include a basic input/output system (BIOS) stored in a read only memory (ROM) and one or more program modules such as operating systems, application programs and program data stored in random access memory (RAM). Computers and mobile devices may also include a variety of interface units and drives for reading and writing data. A user can interact with the computer or mobile device with a variety of input devices, all of which are known to a person skilled in the relevant art. Computers or mobile devices can operate in a networked environment using local connections to one or more remote computers or other devices, such as a server, a router, a network personal computer, a peer device or other common network node, a wireless telephone or wireless personal digital assistant.

The functionality of cloud hub controller 504 may include being able receive data from sensors 108, process sensor data, feed sensor data to a prediction engine that may reside on cloud hub controller 504, send alerts and messages out to users regarding incidents or proposed actions based on sensor data, anonymize data to be saved for analytics and prediction engine training sets, and adjust process equipment 116. While the functionality of cloud hub controller 504 maybe similar to that of on-site server 104 there are some configuration changes between the two servers. For example, if prediction engine 320 is located on onsite server 104, then the training files and knowledge files of said prediction engine 320 are located on onsite server 104 and may need to be updated with additional training sets from other prediction engines 320 from other facilities or sites for better/improved accuracy. however if prediction engine 320 is located on cloud hub controller 504 then prediction engine 320 acts as a global engine for multiple facilities, however in this scenario sensor data would need to be relayed through the network/Internet to cloud hub controller 504 in order for the consumption by prediction engine 320. The architecture of whether prediction engine 320 and other functionality is located on onsite server 104 or cloud hub controller 504 depends on multiple factors including, but not limited to, bandwidth, cost, and latency. A person skilled in the art will recognize the features that cloud hub controller 504 is able to perform and the differences in configuration in comparison to on-site server 104.

Additionally, in embodiments where multiple sites/facilities may be present, multi site management portal 508 may be assessable by users. Multi site management portal 508 may reside on cloud hub controller 504. In other embodiments multi site management portal 508 may reside on its own server. If facilities or sites are in proximity to each other, multi site management portal 508 may also reside locally in proximity to the two sites. Multi site management portal 508 allows a user to view and control process equipment 116 across multiple sites. Multi site management portal 508 also allows a user to view aggregated data from multiple sensors 108 from multiple sites. Multi site management portal 508 differs from a user interface from onsite server 104, as a user interface on onsite server 104 may be limited to controlling process equipment 116 and viewing sensor data from sensors 108 that are locally connected to on site server 104.

As an example, referring to FIG. 5, multi site management portal 508 of cloud hub controller 504 may control process equipment 116 and receive data from sensors 108 of sites 100-A1 and 100A-2 of facility 500-A and sites 100-B1 and 100-B2 of 500-B. In another example, referring to FIG. 6, multi site management portal 508 of cloud hub controller 504-C may control process equipment 116 and receive data from sensors 108 of sites 100-C1 and 100-C2 of facility 500-C, and multi site management portal 508 of cloud hub controller 504-D may control process equipment 116 and receive data from sensors 108 of sites 100-D1 and 100-D2 of facility 500-D.

To access multi site management portal 508 output devices and input devices such as displays mice and keyboard may be used, either locally or remotely. Alternatively multi site management portal 508 may be accessed via client device 112 via the Internet 120. A person skilled in the art will recognize the different configurations and controls available tor multi site management portal 508, and the different methods of accessing multi site management portal 508.

Analytics may also be performed on sensor data received from sensors 108 either on a cloud analytics server 512 or alternatively on onsite server 104. Cloud analytics server 512 may alternatively be an application or container residing on cloud hub controller 504.

Figure 6:
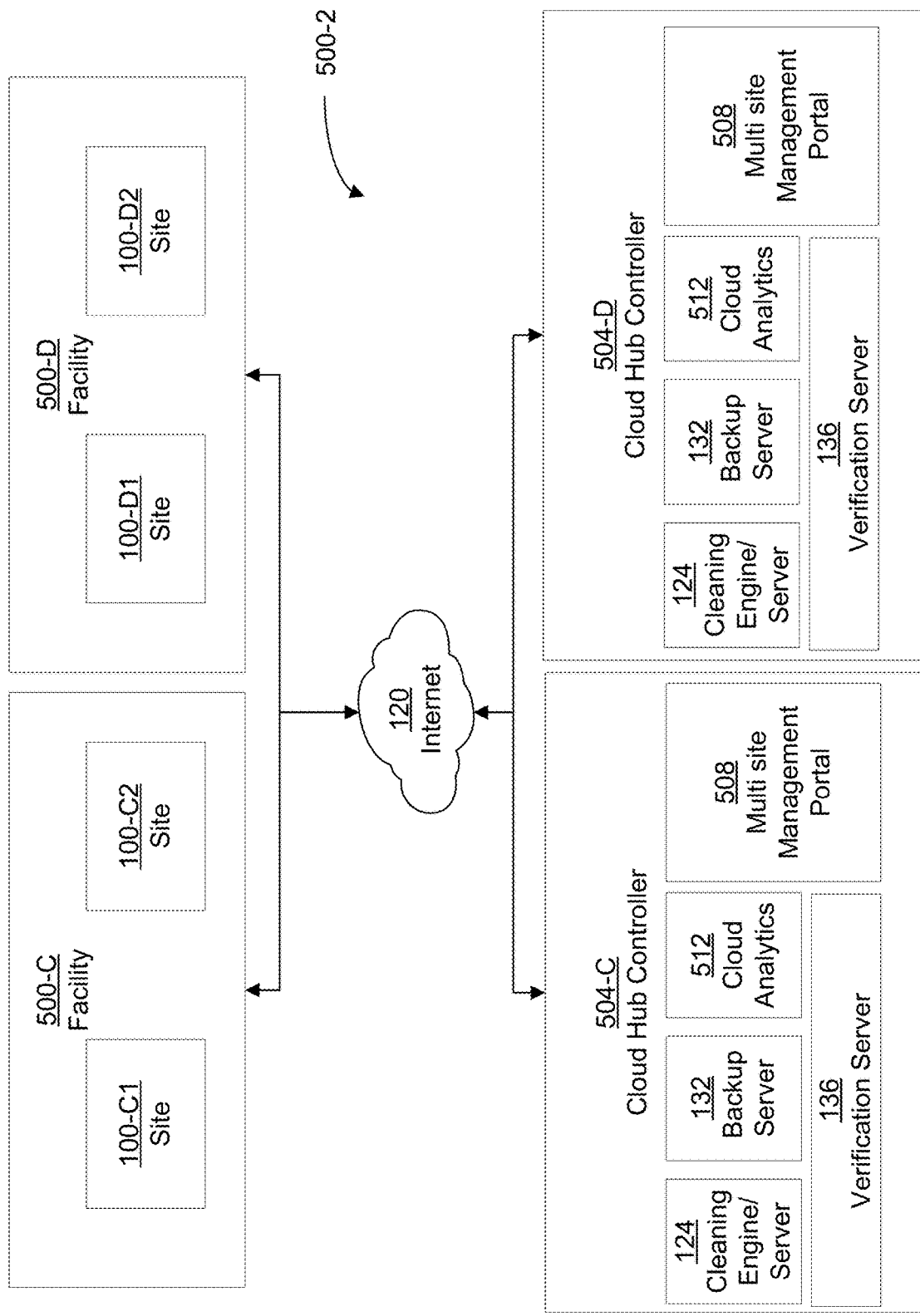
FIG. 6 depicts an example system for monitoring and predictively controlling critical environments for multiple customers, where each customer controls a facility with multiple sites.

Referring to FIG. 6, in the current embodiment as depicted in layout 500-2, each customer, who may own multiple sites or facilities, may each have their own cloud hub controller 504. As can be seen, cloud hub controller 504-C may perform functions on behalf of sites 100-C1 and 100-C2 in facility 500-C, and cloud hub controller 504-D may perform functions on behalf of sites 100-D1 and 100-D2 in facility 500-D. However in alternative embodiments cloud hub controller 504 may act for multiple clients and multiple sites if data is properly segregated in the memory of cloud hub controller 504.

As a cost saving measure, users may also have the options to opt into anonymous cloud sharing of data. This server is an aggregation of multiple sites' data sources. In this process, multiple facilities/companies can be compared against each other for metric's such as energy usage, incidents, up time etc. This sharing of data will help the companies that opt in to know what is possible (Showing best/worst cases), and how they compare up.

Figure 2:
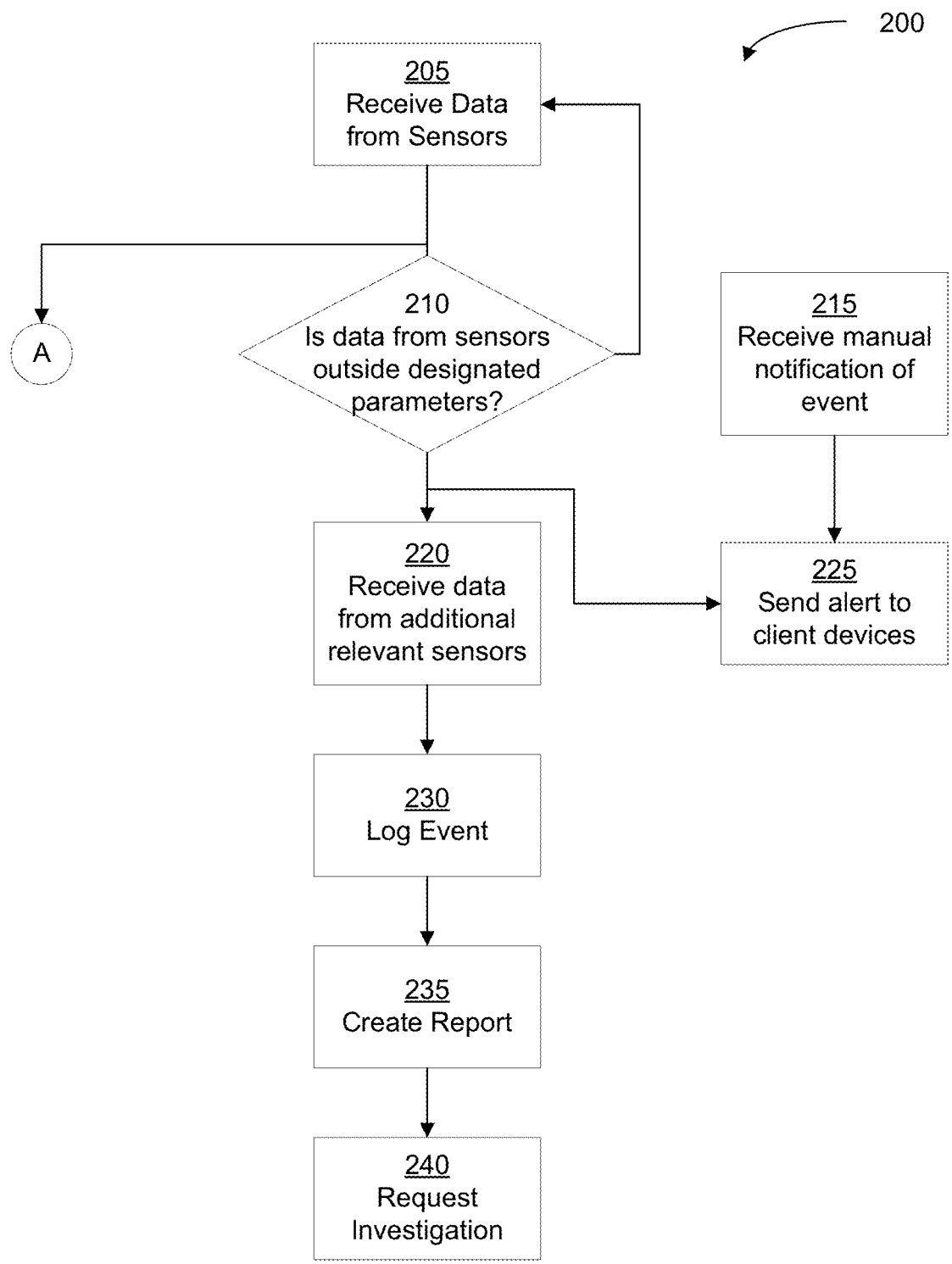
FIG. 2 depicts an example method for monitoring and conditionally controlling critical environments using the system of FIG. 1.

FIG. 2 depicts method 200 for monitoring and predictively controlling environments. As part of the continuous monitoring of the controlled environment and the surrounding facility, sensor data is received by processor 304 from sensors 108. The sensor data is then time-stamped and logged on database 316 through an immutable process. This is depicted at block 205.

Examples of sensor data that may be monitored and received include, but are not limited to, temperature, humidity, differential pressure, non-viable particle monitoring, viable particle monitoring, airflow rates throughout the system, in use and power from the internal distribution system. monitored and received from the weather conditions external to the controlled environment and the power conditions of incoming power from the grid.

Depending on the situation or scenario, a user may be guided through a process to gather sensor data. For example, cameras (as sensors 108) may be used to record images of people gowning up and the camera images may be sent to processor 304. When a user is gowning up in front of a camera they may be asked to rotate so as to allow the camera to capture the user from every angle. The guidance to the user allows for accurate sensor data to be captured by the cameras/sensors 108. It will be understood that the camera may also capture images passively based only on the movements of the user.

As shown in FIG. 2, block 210 depicts processor 304 determining whether the data from sensors 108 is within designated parameters and boundaries. Processor 304 may compare the sensor data to the corresponding parameters for environmental conditions or environmental ranges with respect to the process being completed. For example, the process of manufacturing a vaccine may require a specific temperature range and a specific moisture level. Processor 304 may compare the temperature and humidity data received from sensors 108 during the manufacturing process to the specified ranges. The specified ranges may be obtained either from memory 308 on onsite server 104, or alternatively, may be obtained from verification server 136. If the temperature and humidity are within the specified parameters, then onsite server 104 continues to receive sensor data and monitor the process (returning to block 205). If the temperature and humidity are outside the specified parameters, it is deemed as a potential incident.

A potential incident is one where during a process in a controlled environment, there is a deviation in the environmental condition of the controlled environment. It is important to log any deviations as potential incidents, as they may affect the process or production of items within the controlled environment. Within regulated industries, the conditions and performance of the facility and critical environment are required to be actively monitored and recorded throughout the production of the product.

In addition to the monitoring of sensors 108, a potential incident may also be recorded through a manual notification or manual initiation of the potential incident for example, if there was an unexpected chemical spill within the controlled environment, a worker may indicate to the onsite server 104 through the client device 112 that a potential incident has occurred, as depicted at block 215.

If a potential incident has occurred, all data from all sensors 108 will be received and recorded as part of the potential incident and stored in database 316, as depicted in block 230. In parallel, at block 225, alerts may be sent to client devices 112 to indicate that a potential incident is occurring.

The data from the sensors will then be logged at block 230 onto database 316, and a report may be created at block 235 by onsite server 104. The reporting of the information in a consolidated and easy-to-interpret display in real-time on client devices 112 would allow operations to detect and respond to deviations as they occur.

Onsite server 104 will then request an investigation at block 240. Users will then perform an investigation and save the results of the investigation on onsite server 104. After the incident, onsite server 104 will return to monitoring and receiving sensor data from sensors 108 at block 205.

As previously indicated, within a regulated industry, batch record data is required to positively confirm that the facility and process conditions were met throughout the entire batch, where a batch denotes a set of products being produced or processed. An example embodiment of a process which uses system 100 or method 200 is the Aseptic Filling of an injectable such as vaccines. Temperature, humidity and differential pressures are data sets that have been validated against conditions/environmental ranges for controlled environments to confirm that the facility performed within the specified ranges, and hence the batch would be unadulterated and in good condition.

Another example of this is the storage of critical components under specific conditions. This can be demonstrated through a fridge or freezer that is required to keep materials under specific conditions to maintain the shelf life and quality of the materials.

Figure 3:
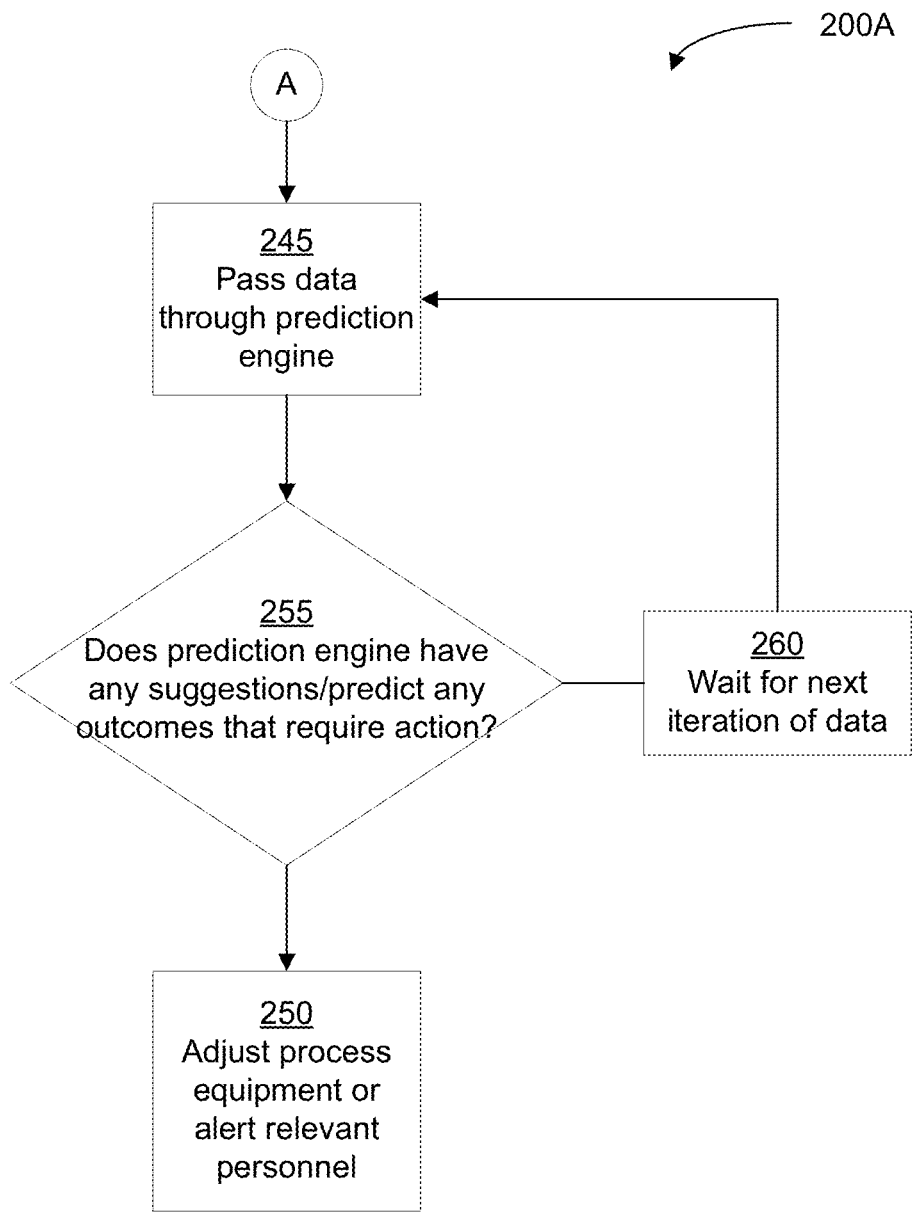
FIG. 3 depicts an example method for predictively and pre-emptively controlling critical environments or alerting relevant personnel using the system of FIG. 1.

Referring to FIG. 3, method 200A may be used to minimize potential incidents, maximize efficiency and minimize costs in power usage, prediction engine 320 may be used. At block 245, the prediction engine may receive sensor data from sensors 108 for review.

By reviewing sensor data, the prediction engine 320 will be able to determine the expected sensor data depending on the process or product being produced or based on other sensor data. For example, after receiving multiple points of sensor data for the production of vaccines, the prediction engine 320 will know what the expected temperature should be for the production of vaccines. In another example, the prediction engine may receive several points of temperature data from outside the facility and determine the correlation between the temperature on the outside of the facility and the inside of the facility. In this case, it will help the facility to reduce or increase that specific parameter with a slight slope rather than a sharp slope to save energy.

At block 250, the prediction engine may request processor 304 to adjust process equipment to either prevent a potential incident from occurring or apply sets of changes with the aim of saving energy and costs. For example, if the prediction engine is aware of the temperature increasing outside the facility due to weather conditions, the prediction engine may request processor 304 to slowly lower the temperature in the controlled environment as opposed to a sharp decrease in temperature which may use more energy in a particular timeline.

In an alternative embodiment, the prediction engine may reside on anonymous web server 128, allowing the prediction engine to review data on anonymous web server 128. With data sets collected and performing machine learning and big data analytics to the data sets, the conditions that create a deviation/potential incident could be predicted and in real-time the operations could be adjusted to prevent a deviation or incident from occurring, in the cloud as well as onsite server.

Another example of system 100 and method 200 is cell therapy production which requires materials to be stored in specific refrigerated conditions and ultra-low temperature freezing conditions. Onsite server 104 would monitor the temperature of the fridge or freezer, but also the amount of time the fridge or freezer door is open and other critical equipment, such as compressors, condensers, evaporators and fans, required to maintain those conditions. Based on the use of the freezer, the amount of time the door is opened and the performance criteria of the associated equipment, such as the compressors, fans, etc., onsite server 104 may monitor and confirm that the storage conditions are met. This would create data sets that could then be assessed through machine learning and big data analytics to predict failure or non-conformance conditions in real-time and prevent further deviations from occurring.

In another embodiment, the prediction engine 320 may be used to review image data from cameras. As previously indicated, cameras may take images of users as they are performing duties, such as, for example, gowning up in the clean room. The camera sensor data/images/videos may be of the users gowning up, or still images of a person from multiple angles after gowning up. Alternatively, cameras may also observe users as they go about their business within the controlled environment. The training data that is provided to prediction engine 320 to detect any failure in gowning up, or if there is any exposed skin includes videos and images of both failures and success of users, and providing the data to the prediction engine 320 to learn. As time progresses, additional training data that has been anonymized and placed into web server 128 or in storage on cloud hub controller 504 may be fed to prediction engine 320 to better its accuracy.

Returning to the detection, the data may be fed to prediction engine 320 to review of any signs of exposed skin, or if the order of operations surrounding the process of gowning up is incorrect. This is important in use cases of clean rooms, pharmaceuticals or vivarium, where skin covering is essential. For example, prediction engine 320 may be able to determine from video data if a user does not use proper sealing procedures after a user puts on a glove. Alternatively, prediction engine 320 may be able to determine if a user forgets to close the seal between the glove and the sleeve.

If there is a detection by prediction engine 320 of a failure of gowning up properly, or if prediction engine 320 detects any exposed skin, it may provide an action hook for either onsite server 104 or cloud hub controller 504 to send an alert to the relevant users. Alternatively, if there is a display in the controlled environment, a message may be displayed to the user who is gowning up, to indicate to them as to the location of exposed skin, or the misapplied step when gowning up.

In alternative embodiments, the cameras may be located both inside the controlled environment and outside the controlled environment, where cameras outside the controlled environment may send data to prediction engine 320 to ensure that a person is properly robed/gowned, prior to allowing entry into the controlled environment through controlled access and locks. In addition, the cameras located within the controlled environment may send data to prediction engine 320 to determine if there is any exposed skin when personnel are within the controlled environment. For example, a gown or clean suit may rip while a user is within the controlled environment. If a prediction engine 320 determines that personnel have become exposed within the controlled environment, onsite server 104 may provide warnings on client devices 112 within he controlled environment and may even further prevent personnel from egressing from the controlled environment.

In alternative embodiments, prediction engine 320 may use the anonymous data from web server 128 or from storage on cloud hub controller 504 to review all sensor data, events and incidents that have been recorded for training. This allows the system 100 to learn about real events, and to find connections between the cause and effect that will appear in unexpected ways.

As indicated above, by reviewing the ambient temperature, and outside temperature, and taking into account weather patterns, and the time of the year and time of the day, prediction engine 320 may pre-emptively adjust environmental conditions in controlled environments to allow for a more gradual change in environment. This allows for not just a savings in cost, especially if the system takes advantage of cheaper energy costs at different parts of the day, but also allows for reduced shock on products or items that may occur when rapid environmental conditions are changed within the controlled environment.

Furthermore, prediction engine 320 may also review sensor data regarding power usage and pitch noise coming from components with moving parts. For example, if a motor is about to fail, it may provide an indication of upcoming failure through a change in pitch or a change in noise of the motor. Prediction engine 320 may see this trend and be able to provide action hooks so as to alert the appropriate personnel.

In alternative embodiments, system 100 may be integrated with a battery management system ("BMS") to allow additional control around cost management. This is another feature which enables the client to tie environmental data to production cost. Through the usage of environmental, power and sensor monitoring, operating cost is able to be predicted given the range of factors, and can be shared with a BMS/Cost management application.

Furthermore, in alternative embodiments, there is an ability to pull historical data in any configuration, timeframe, and view to make a custom report. The reports can tie multiple sensors, clean rooms and applications together, and view the plotted data on a timeline. This allows for a unique analysis of the data that is otherwise not possible and can generate insights about causes and effects that are otherwise not seen.

In alternative embodiments, system 100 can also get the data from the open-source $3^{rd}$ party to predict the critical situation and prevent it by setting a timeline of conditioning the space based on the necessary requirements. A person skilled in the art will recognize that system 100 and method 200 can be applied to any critical process equipment where key parameters and functional equipment are identified, monitored and reported.

The scope of the claims should not be limited by the embodiments set forth in the above examples, but should be given the broadest interpretation consistent with the description as a whole. Although the foregoing description and accompanying drawings to specific preferred embodiments of the present invention as presently contemplated by the inventor, it will be understood that various changes, modifications and adaptations, may be made without departing from the spirit of the invention.

We claim:

1. A system for anticipating environmental conditions within a critical environment needed to maintain a set of established environmental parameters within the critical environment, the system comprising:
   a sensor associated with the critical environment to obtain sensor data about the critical environment, the sensor including at least a door sensor associated with a door to obtain sensor data to determine whether the door of the critical environment is open or closed, and a duration of time the door is open or closed, the sensor including at least a camera, the camera being configured to capture sensor data inside the critical environment and outside the critical environment;
   a controller operatively connected to process equipment and controlling the operation of the process equipment;
   a server in communication with the sensor to receive the sensor data from the sensor and in communication with the controller to transmit control data to the controller, the server further comprising a prediction engine and a fault detection monitoring module; wherein the server receives sensor data and passes the sensor data through the prediction engine to determine anticipated environmental conditions within the critical environment based on the sensor data to maintain the established environmental parameters and the server transmitting the control data to the controller to enable the process equipment to effect the environmental conditions needed to maintain the set of established environmental parameters within the critical environment; and
   a client device located outside the critical environment, the client device being configured to display the sensor data on a graphical user interface;
   wherein the server passes the received sensor data through the fault detection monitoring module to determine if received sensor data is an outlier, a potential fault in the sensor, or a potential fault in the process equipment,
   wherein the server is configured to provide a first visual indicator, a second visual indicator or a third visual indicator to display on the graphical user interface; the first visual indicator being configured to indicate that a user may enter the critical environment; the second visual indicator being configured to indicate that a user to proceed with caution when entering the critical environment; the third visual indicator being configured to indicate that a user may not enter the critical environment;
   wherein if the environmental conditions of the critical environment are within the set of established environmental parameters while accounting for the anticipated environmental conditions, the server being configured to provide the first visual indicator to display on the graphical user interface;
   wherein if the environmental conditions of the critical environment are not within the set of established environmental parameters and where the environmental conditions are capable of being re-established to be within the set of established environmental parameters:
      if the door being opened for a predetermined period of time does not lead to the environmental conditions reaching a minimum threshold of environmental conditions where the critical environment is deemed to have failed, the server being configured to provide the second visual indicator to display on the graphical user interface;
      if the door being opened for the predetermined period of time leads the environmental conditions reaching or surpassing the minimum threshold of environmental conditions where the critical environment is deemed to failed, the server being configured to provide the third visual indicator to display on the graphical user interface;
   wherein if the environmental conditions of the critical environment are not within the set of established environmental parameters and where the environmental conditions are incapable of being re-established to be within the set of established environmental parameters, the server being configured to provide the third visual indicator to display on the graphical user interface.

2. The system of claim 1, wherein the prediction engine being trained using previously measured sensor data and by one or more artificial intelligence-based modules on sensor data of environment conditions that leads up to the set of established environmental parameters.

3. The system of claim 1, wherein the prediction engine being trained using previously measured sensor data and by one or more artificial intelligence-based modules on fault detection monitoring.

4. The system of claim 1 wherein the set of established environmental parameters comprise temperature, humidity, differential pressure, non-viable and viable particle monitoring, airflow rates throughout the system, and time in use.

5. The system of claim 4 further comprising a first and second sensor, wherein at least one of the first or second sensor obtains outside sensor data from areas external to the critical environment, the sensor data comprising the outside sensor data.

6. The system of claim 5 further comprising a client device for displaying a discrepancy between the anticipated environmental conditions within each critical environment and the established environmental parameters.

7. The system of claim 1, wherein the server is an onsite server.

8. The system of claim 1, wherein the server is a cloud hub controller located off site.

9. The system of claim 1, wherein the critical environment is a clean room.

10. The system of claim 1, wherein the critical environment is a refrigerated room.

11. The system of claim 1 further comprising a verification server in communication with the server, the verification server comprising specification data on ranges of compliant environmental conditions, the server being configured to compare the sensor data received with the specification data, wherein if the sensor data received is outside the range of compliant environmental conditions the server being configured send notifications of a potential incident.

12. The system of claim 1 wherein the server logs received sensor data into a database compliant with governmental regulations.

13. The system of claim 1, wherein the sensor data includes a number of individuals within the critical environment, and the duration of time the individuals are within the critical environment.

14. The system of claim 1, wherein the server receives real time weather data and passes the real time weather data in addition to the sensor data through the prediction engine to determine anticipated environmental conditions within the critical environment.

15. The system of claim 1, wherein the sensor data captured by one of an internal camera or an external camera includes a user receiving at least one instruction to allow one of the internal camera or the external camera to capture the user from a specific angle.

16. A system for anticipating environmental conditions within a critical environment needed to maintain a set of established environmental parameters within the critical environment, the system comprising:
  a process equipment for maintaining the set of established environmental parameters within the critical environment;
  a first sensor and a second sensor associated with the critical environment to obtain sensor data about the critical environment, the first sensor located within the critical environment, the second sensor located outdoors and external to a building that includes the critical environment, the second sensor being configured to obtain sensor data associated with outside weather external to the building that includes the critical environment;
  a controller operatively connected to the process equipment and controlling the operation of the process equipment;
  a server in communication with the first sensor and the second sensor to receive the sensor data from the first sensor and the second sensor, the server in communication with the controller to transmit control data to the controller, the server further comprising a prediction engine;
  a client device located outside the critical environment, the client device being configured to display the sensor data on a graphical user interface;
  wherein the server receives sensor data and passes the sensor data through the prediction engine to determine anticipated environmental conditions within the critical environment based on the sensor data to maintain the established environmental parameters and the server transmitting the control data to the controller to enable the process equipment to effect the environmental conditions needed to maintain the set of established environmental parameters within the critical environment,
  wherein the server is configured to provide a first visual indicator, a second visual indicator or a third visual indicator to display on the graphical user interface; the first visual indicator being configured to indicate that a user may enter the critical environment; the second visual indicator being configured to indicate that a user to proceed with caution when entering the critical environment; the third visual indicator being configured to indicate that a user may not enter the critical environment;
  wherein if the environmental conditions of the critical environment are within the set of established environmental parameters while accounting for the anticipated environmental conditions, the server being configured to provide the first visual indicator to display on the graphical user interface;
  wherein if the environmental conditions of the critical environment are not within the set of established environmental parameters and where the environmental conditions are capable of being re-established to be within the set of established environmental parameters:
    if a door being opened for a predetermined period of time does not lead to the environmental conditions reaching a minimum threshold of environmental conditions where the critical environment is deemed to have failed, the server being configured to provide the second visual indicator to display on the graphical user interface;
    if a door being opened for the predetermined period of time leads the environmental conditions reaching or surpassing the minimum threshold of environmental conditions where the critical environment is deemed to failed, the server being configured to provide the third visual indicator to display on the graphical user interface;
  wherein if the environmental conditions of the critical environment are not within the set of established environmental parameters and where the environmental conditions are incapable of being re-established to be within the set of established environmental parameters, the server being configured to provide the third visual indicator to display on the graphical user interface.

17. The system of claim 16 further comprising a third sensor located indoors and external to the critical environment.

* * * * *